United States Patent [19]

Shimizu et al.

[11] Patent Number: 5,347,346
[45] Date of Patent: Sep. 13, 1994

[54] IMAGE FORMING APPARATUS WITH IMPROVED EFFICIENCY OF MAINTENANCE CONTROL

[75] Inventors: Tadafumi Shimizu, Toyokawa; Yoshiaki Takano, Toyohashi; Hiroyuki Ideyama; Manabu Kamitamari, both of Toyokawa; Kadotaro Nishimori, Amagasaki; Yoshihiko Hatta, Toyokawa; Masazumi Ito; Tsugihito Yoshiyama, both of Toyohashi; Yoshifumi Shibata, Toyokawa; Yoshiaki Hata, Ashiya, all of Japan

[73] Assignee: Minolta Camera Kabushiki Kaisha, Osaka, Japan

[21] Appl. No.: 632,076
[22] Filed: Dec. 21, 1990

[30] Foreign Application Priority Data

Dec. 25, 1989 [JP] Japan .................. 1-337254
Dec. 25, 1989 [JP] Japan .................. 1-337255
Dec. 25, 1989 [JP] Japan .................. 1-337256
Dec. 25, 1989 [JP] Japan .................. 1-337257

[51] Int. Cl.⁵ .......................... G03G 21/00
[52] U.S. Cl. .................. 355/202; 355/203; 355/204; 355/206; 355/208; 355/209; 355/246; 371/16.4; 371/29.1; 364/186
[58] Field of Search ........... 355/200, 202, 203, 204, 355/206, 207, 208, 209, 228, 246, 205; 364/186; 371/29.1, 16.4

[56] References Cited

U.S. PATENT DOCUMENTS

| | | | |
|---|---|---|---|
| 3,788,739 | 1/1974 | Coriale | 355/246 |
| 3,893,175 | 7/1975 | Solomon | 346/33 M |
| 3,997,873 | 12/1976 | Thornton | 340/149 R |
| 4,162,396 | 7/1979 | Howard et al. | 235/304 |
| 4,167,322 | 9/1979 | Yano et al. | 355/202 |
| 4,260,904 | 4/1981 | Horie et al. | 355/206 X |
| 4,322,813 | 3/1982 | Howard et al. | 355/209 X |
| 4,348,099 | 9/1982 | Fantozzi | 355/208 |
| 4,416,536 | 11/1983 | Itoh et al. | 355/208 X |
| 4,419,006 | 12/1983 | Nagashima | 355/209 |
| 4,497,037 | 1/1985 | Kato et al. | 355/202 X |
| 4,549,044 | 10/1985 | Durham | 179/5 R |
| 4,583,834 | 4/1986 | Seko et al. | 355/206 |
| 4,589,080 | 5/1986 | Abbott et al. | 364/552 |
| 4,739,366 | 4/1988 | Braswell et al. | 355/208 |
| 4,766,548 | 8/1988 | Cedrone et al. | 364/479 |
| 4,797,706 | 1/1989 | Sugishima et al. | 355/200 |
| 4,835,671 | 5/1989 | Sato et al. | 364/186 |
| 4,875,078 | 10/1989 | Resch, III et al. | 355/246 |
| 4,979,132 | 12/1990 | Sugimoto | 364/520 |
| 4,994,926 | 2/1991 | Gordon et al. | 358/400 |
| 4,996,703 | 2/1991 | Gray | 379/40 |
| 4,999,672 | 3/1991 | Rice, Jr. et al. | 355/202 |
| 5,021,826 | 6/1991 | Maruta | 355/205 |
| 5,021,828 | 6/1991 | Yamaguchi | 355/209 |
| 5,023,817 | 6/1991 | Au | 364/550 |
| 5,057,866 | 10/1991 | Hill, Jr. et al. | 355/200 |
| 5,077,582 | 12/1991 | Kravette et al. | 355/206 |
| 5,084,875 | 1/1992 | Weinberger et al. | 371/291 |
| 5,214,722 | 5/1993 | Weinberger et al. | 355/205 X |

FOREIGN PATENT DOCUMENTS

| | | | |
|---|---|---|---|
| 0064272 | 4/1982 | Japan | 355/209 |
| 59-142559 | 8/1984 | Japan . | |
| 60-90460 | 5/1985 | Japan . | |
| 0203966 | 10/1985 | Japan | 355/209 |
| 63-301667 | 8/1988 | Japan . | |
| 301667 | 12/1988 | Japan . | |
| 1-271767 | 10/1989 | Japan . | |
| 0011364 | 1/1992 | Japan | 355/209 |

OTHER PUBLICATIONS

Lynn S. Ritter, "Remote Diagnostic—Tool Kit of the Future", 1989, pp. 1–6, Dataquest Research Newsletter.

Primary Examiner—Benjamin R. Fuller
Assistant Examiner—J. Barlow
Attorney, Agent, or Firm—Burns, Doane, Swecker & Mathis

[57] ABSTRACT

The image forming apparatus according to the present invention is connectable to an external device through a communication line, and includes an image forming device for forming an image on paper and a device for setting specified set conditions in the image forming device. The image forming apparatus performs image forming operation corresponding to the set conditions, and further includes a receiving device for receiving a control signal from the communication line and a transmission device for transmitting the set conditions through the communication line in response to reception of the control signal.

34 Claims, 29 Drawing Sheets

FIG.5

| SET LEVEL (HV LEVEL) | SW1 | SW2 | SW3 | SW4 | SW5 | SW6 | SW7 | SW8 | SURFACE POTENTIAL [V] | NOTE |
|---|---|---|---|---|---|---|---|---|---|---|
| LEVEL1 | ON | ON | ON | ON | ON | ON | ON | ON | 590 | LOWEST LIMIT VALUE |
| LEVEL2 | ON | ON | ON | ON | ON | ON | ON | — | 605 | |
| LEVEL3 | ON | ON | ON | ON | ON | ON | — | — | 620 | |
| LEVEL4 | ON | ON | ON | ON | ON | — | — | — | 635 | |
| LEVEL5 | ON | ON | ON | ON | — | — | — | — | 650 | REFERENCE VALUE |
| LEVEL6 | ON | ON | ON | — | — | — | — | — | 665 | |
| LEVEL7 | ON | ON | — | — | — | — | — | — | 680 | |
| LEVEL8 | ON | — | — | — | — | — | — | — | 695 | |
| LEVEL9 | — | — | — | — | — | — | — | — | 710 | HIGHEST LIMIT VALUE |

FIG.7

| SET LEVEL (T/C LEVEL) | NUMBER OF ALTERATION OF LEVEL n | TONER WEIGHT PERCENTAGE T/C [wt %] | OUTPUT VOLTAGE OF TONER CONSENTRATION SENSOR 80 VT [V] | DARK POTENTIAL V0 [V] | GRAY POTENTIAL Vi [V] | NOTE |
|---|---|---|---|---|---|---|
| LEVEL 1 | 0 | 5 | 2.85 | VB+430 | VB+130 | REFERENCE VALUE |
| LEVEL 2 | 1 | 6 | 2.25 | VB+410 | VB+110 | |
| LEVEL 3 | 2 | 7 | 1.60 | VB+390 | VB+90 | |
| LEVEL 4 | 3 | 8 | 1.00 | VB+370 | VB+70 | HIGHEST LIMIT VALUE |

FIG.10

| SET LEVEL (VB LEVEL) | TARGET VALUE OF DEVELOPING BIAS VB [V] | NOTE |
|---|---|---|
| LEVEL1 | 180 | |
| LEVEL2 | 190 | |
| LEVEL3 | 200 | |
| LEVEL4 | 210 | |
| LEVEL5 | 220 | REFERENCE VALUE |
| LEVEL6 | 230 | |
| LEVEL7 | 240 | |
| LEVEL8 | 250 | |
| LEVEL9 | 260 | |

FIG.11

| SET LEVEL (EXP LEVEL) | TARGET VALUE OF EXPOSURE AMOUNT [Lux·sec] | NOTE |
|---|---|---|
| LEVEL1 | 1.60 | |
| LEVEL2 | 1.70 | |
| LEVEL3 | 1.80 | |
| LEVEL4 | 1.90 | |
| LEVEL5 | 2.00 | REFERENCE VALUE |
| LEVEL6 | 2.10 | |
| LEVEL7 | 2.20 | |
| LEVEL8 | 2.30 | |
| LEVEL9 | 2.40 | |

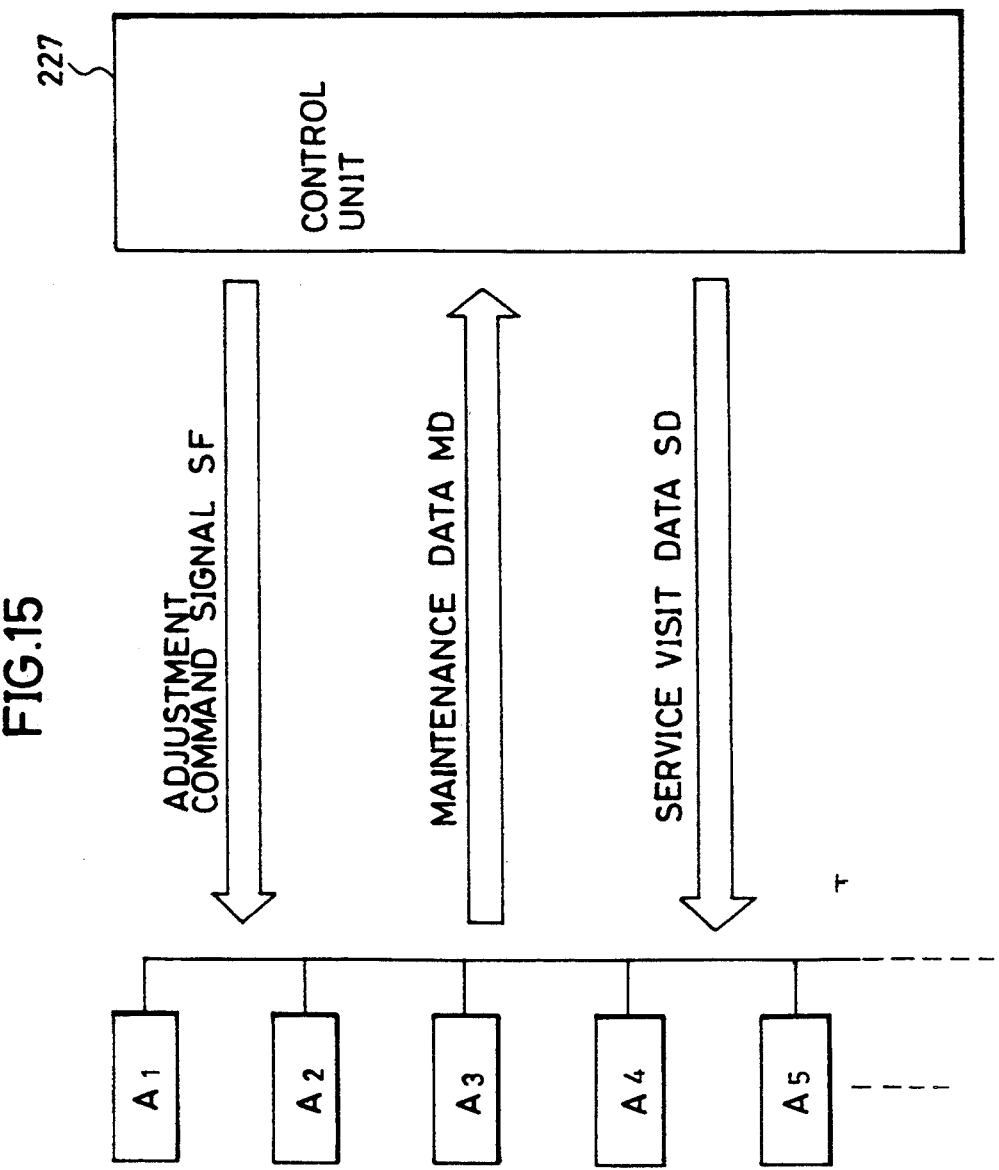

FIG. 23

SCHEDULE TABLE ST

| YEAR | SV MONTH | DATE | | MACHINE NUMBER Mn — CONDITION C |
|---|---|---|---|---|
| 89 | 4 | 1 | AM | |
| | | | PM | Mn 3 — G |
| 89 | 4 | 2 | AM | Mn 10 — G |
| | | | PM | Mn 4 — J |
| 89 | 4 | 3 | AM | |
| | | | PM | Mn 6 — G |
| 89 | 4 | 4 | AM | Mn 9 — N |
| | | | PM | Mn 5 — G |
| 89 | 4 | 5 | AM | Mn 7 — G |
| | | | PM | Mn 8 — G |
| 89 | 4 | 12 | AM | |
| | | | PM | Mn 1 — G |
| 89 | 4 | 13 | AM | |
| | | | PM | |
| 89 | 5 | 2 | AM | |
| | | | PM | Mn 2 — G |
| 89 | 5 | 3 | AM | |
| | | | PM | |
| 89 | 5 | 4 | AM | |
| | | | PM | |
| 89 | 5 | 5 | AM | |

245

IMAGE FORMING APPARATUS WITH IMPROVED EFFICIENCY OF MAINTENANCE CONTROL

CROSS-REFERENCE TO RELATED, COPENDING APPLICATION

Related, copending application of particular interest to the instant application is U.S. Ser. No. 526,900, entitled "Management System for Managing Maintenance Information of Image Forming Apparatus", filed May 22, 1990 and assigned to the same assignee of the instant application.

BACKGROUND OF THE INVENTION

1. Field of the Invention

The present invention relates to an image forming apparatus, and particularly to an image forming apparatus connectable to an external centralized control unit or the like through a communication line.

2. Description of the Related Art

Generally, in image forming apparatuses which form hard copy images using electrophotography process such as a copying machine, a facsimile, and an optical printer, display means for informing operators that some kind of trouble has occurred making image forming impossible is provided. Accordingly, small troubles such as lack of consumable goods such as paper and toner, or paper jams can be solved by operators themselves by supplying the consumable goods or removing the jammed paper to start image forming again.

As for troubles which operators can not handle, a display of a so-called service man call for demanding a contact with a service man appears.

Conventionally, some of there image forming apparatuses are configured to be connectable to an external control unit (host) through a communication line.

For example, the copying machine disclosed in Japanese Patent Laying-Open No. 59-142559 is configured to output data showing the conditions of use such as the number of times of copying according to a control signal from the host.

According to the copying machine, even if the copying machines are provided at places mutually spaced apart, the plurality of copying machines can be concentrically controlled by a host provided at a single place, so that totalization of use conditions or the like of the respective copying machines can be easily carried out.

In addition, in the copying machines shown in the above-mentioned Official Gazette, interphone devices which become communicatable upon a call from the host side are provided.

Recently, a centralized control system having objects of rapid maintenance and low maintenance cost for respective image forming apparatus has been developed, in which each of a plurality of image forming apparatuses provided on each user side and a control unit (host) at a maintenance station (service station) where service men are waiting are connected through a communication line.

The maintenance includes, in addition to repair of faults, confirmation of operating conditions, adjustment of each portion according to the conditions, and so forth.

In a conventional image forming apparatus, however, although it is connectable to a communication line, the operator side can not call a service station employing the communication line. Therefore, the operator had to try to have a contact with a service man by means of another communication means, such as a telephone, every time he demands a visit of the service man (a service visit).

A service visit is usually requested when an operator makes a determination according to his subjective point of view that the image quality is degraded even if image forming is possible, that is, when a user claim is produced, in addition to the above-described case where an image can not be formed.

On the other hand, a service man tries to know the contents of the trouble or conditions on the basis of the information given by the operator when he receives a request for a service visit. However, although he can know the outline of the conditions, he can not properly understand a cause of the trouble, the extent of the image quality, the details of the conditions and so forth.

Accordingly, in the service station, it has been difficult to select when a service visit should be made according to the extent of emergency, and repairing parts to be prepared for the service visit. Also, on the visited user side, the work should be started by conforming the condition, so that the efficiency of maintenance is low.

SUMMARY OF THE INVENTION

It is an object of the present invention to try to speed up maintenance in an image forming apparatus.

It is another object of the present invention to reduce maintenance costs in an image forming apparatus.

It is still another object of the present invention to reduce a burden of maintenance control on a user side in an image forming apparatus.

It is yet another object of the present invention to enhance efficiency of maintenance by a service man in an image forming apparatus.

It is still another object of the present invention to improve familiarity between the user side and the service side in an image forming apparatus.

It is yet another object of the present invention to make it easier for the user side to confirm the date of a service visit by a service man in an image forming apparatus.

In order to achieve the above-described objects, an image forming apparatus according to one aspect of the present invention can be connected to an external control unit through a communication line, and includes image forming means for forming an image on paper, receiving means for receiving a control signal from a communication line, and detecting means for detecting conditions of the image forming means in response to the received control signal.

In an image forming apparatus configured as described above, since conditions of the image forming means are detected by a control signal from a communication line, the maintenance of the image forming apparatus is easier.

In order to achieve the above-described objects, a control system of an image forming apparatus according to another aspect of the present invention, includes a plurality of image forming apparatuses, and a control unit connected to each of the image forming apparatuses through a communication line, where each of the image forming apparatuses includes image forming means for carrying out an image forming operation according to a previously set value determining image quality, means for receiving a predetermined control signal transmitted through a communication line from a control unit, detecting means for detecting operation conditions of the image forming means in response to the received control signal, means for altering the set value on the basis of the detected result by the detecting means, and means for transmitting information indicating the altered set value through a communication line to the control unit. The control unit includes a means for transmitting a control signal to at least one of the image forming apparatus, means for receiving the information transmitted from the image forming apparatus, and means for supplying as an output the information received by the receiving means.

With the image forming apparatus configured as described above, the information can be transmitted and received to and from the image forming apparatus and the control unit through a communication line, so that the familiarity between the user side and the service side is improved to enhance the efficiency of maintenance control of an image forming apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing set levels of the surface potential of the corona charger of FIG. 4.

FIG. 7 is a diagram showing relationship among set levels of the toner weight percentage, dark potential and gray potential.

FIG. 10 is a diagram showing set levels of the development bias according to the first embodiment of the present invention.

FIG. 11 is a diagram showing set levels of the exposure amount according to the first embodiment of the present invention.

FIG. 15 is a diagram showing the contents of communication in the control net work system of FIG. 13.

FIG. 23 is a diagram showing one example of the contents of the schedule table used in the flow of FIGS. 22A and 22B.

DESCRIPTION OF THE PREFERRED EMBODIMENTS

Embodiments of the present invention will be described below referring to the figures.

Figure 2:
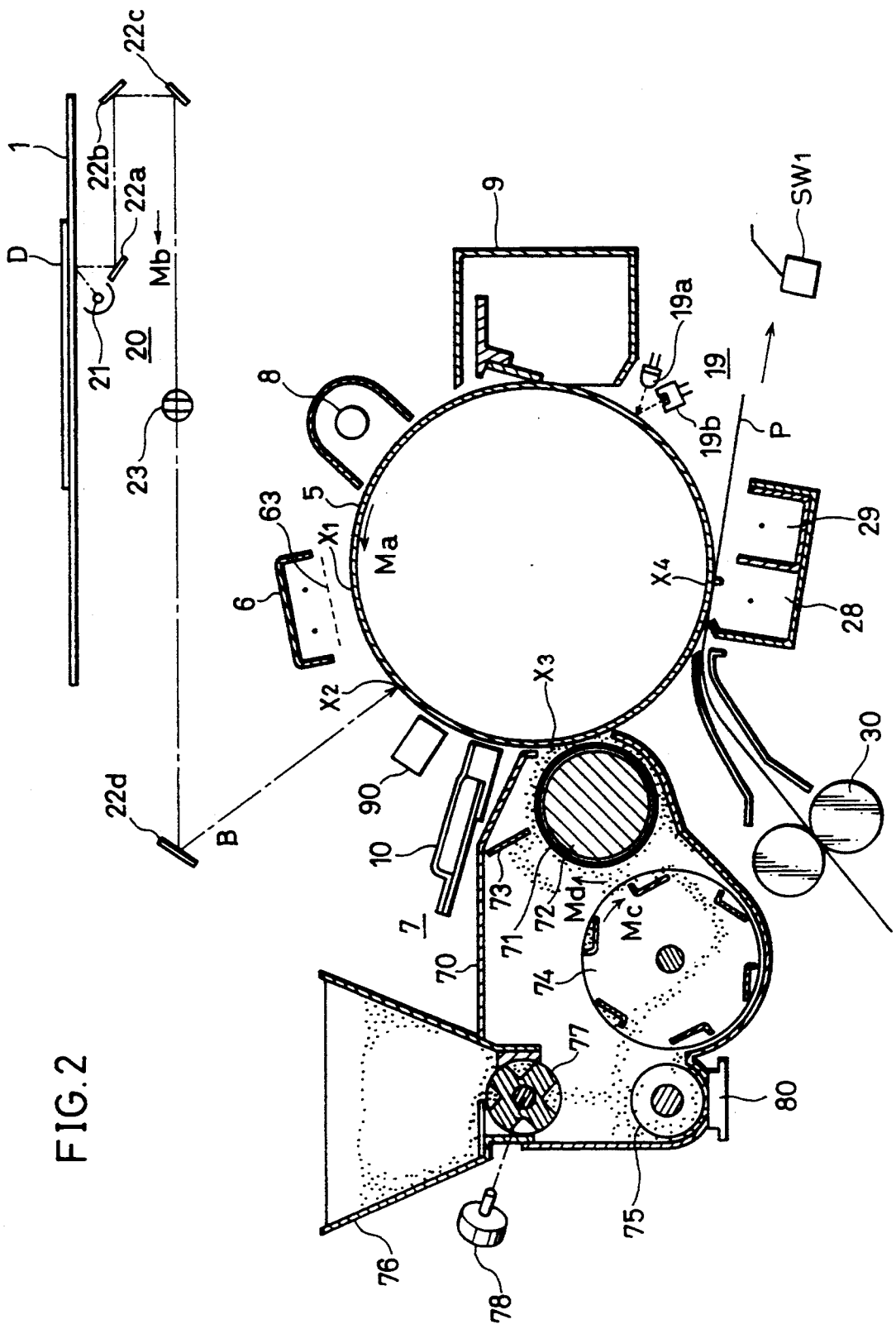
FIG. 2 is a cross sectional structural view showing a main portion of the copying machine of FIG. 1.

FIG. 2 is a front cross sectional view showing a main portion of a copying machine A.

In the figure, a photoreceptor drum 5 is provided which is rotatable in the direction of the arrow Ma at a constant circumferential speed v. Around the drum, for the electrophotography process, a corona charger 6, an eraser 10 for portions between images, a developing device 7, a transfer charger 28, a separating charger 29, a cleaning device 9, and a main eraser 8 are provided. Between an exposure position X2 and the eraser 10, a surface electrometer 90 for measuring a surface potential of the photoreceptor drum 5 is provided. Also, between the separating charger 29 and the cleaning device 9, a reflection type photosensor 19 including emitter element 19a and a receiving element 19b is provided for measuring the density of a reference toner image.

The surface of photoreceptor drum 5, passing through the corona charger 6, is evenly charged and exposed by an optical system 20 at the exposure position X2. By the exposure, the surface charge of photoreceptor drum 5 is partially removed and a latent image corresponding to the original D is formed on the surface of photoreceptor drum 5. The surface charge except the portion of the latent image is eliminated by eraser 10.

The optical system 20 includes an exposure lamp 21 for irradiating the original D provided on a platen glass 1, mirrors 22a-d for leading the reflected light B from the original D to the exposure position X2, and a projecting lens 23. In exposure scanning to the original D, exposure lamp 21 and mirror 22a move at a speed of v/m (m indicates a copying magnification) in the direction designated by the arrow Mb, and mirrors 22b, 22c are movable at a speed of v/2m.

The latent image formed on the surface of photoreceptor drum 5 is developed by developing device 7 to appear as a toner image.

The developing device 7 performs a so-called non-reversal development, in which a developer composed of a mixture of magnetic carrier and insulative toner is employed, and the toner sticks to a latent image (a charge existing portion, or a non-exposed portion) passing through a developing position X3 by the well-known magnetic brush system. In a developer tank 70, there are a developing sleeve 71 having a magnetic roller 72 therein, a brush height regulating plate 73, a bucket roller 74 and a screw roller 75, and a toner concentration sensor 80 is provided below the screw roller 75.

When the bucket roller 74 rotates in the direction designated by the arrow Mc, the developer sticks to the outer peripheral surface of the developing sleeve 71 with the magnetic force of the magnetic roller 72, which is transported to the developing position X3 with the rotation of the developing sleeve 71 in the direction of the arrow Md. The toner concentration sensor 80 measures the weight percentage T/C [wt %] of the toner with respect to the entire developer based on the permeability of the developer.

A toner tank 76 is provided above developing tank 70 and a toner supply roller 77 is provided in the bottom portion thereof. With the toner supply roller 77 rotation-driven by a supply motor 78, the toner is supplied from toner tank 76 to screw roller 75. The supplied toner is stirred and mixed with the developer already existing inside the developing tank 70 with the rotation of screw roller 75 to be sent to bucket roller 74. Frictional electrification is produced in the stirring and mixing, so that the magnetic carrier and the toner are charged in different polarities. The toner of negative polarity sticks to the surface of photoreceptor drum 5 at the developing position X3 because of electrostatic adsorption with the surface charge of photoreceptor drum 5. Then, in order to prevent the toner from sticking because of the residual charge (charge remaining in the exposed portion) on the surface of photoreceptor drum, developing bias VB of a predetermined voltage is applied to developing sleeve 71.

The paper P is transported while keeping timing with rotation of photoreceptor drum 5 by timing roller 30, and a toner image is transferred to the paper P by transfer charger 28 at the transfer position X4. The paper P in which the toner image is transferred is separated from photoreceptor drum 5 by separating charger 29 to be sent to a fixing device out of the figure.

Subsequently, on the surface of photoreceptor drum 5, the remaining toner is removed by cleaning device 9, and the residual charge is removed by main eraser 8 for preparation of the next exposure.

Here, the detection of paper jams is carried out according to such well known methods as shown in U.S. Pat. Nos. 4,878,087 and 3,995,953 and so forth. A switch SW1 of the FIG. 2 is one of jam detecting sensors. If a head portion of paper P is not detected by the jam sensor SW1 in a predetermined period after the point of starting feeding the paper P with timing roller 30 rotating, a determination is made that a jam occurred in the vicinity of timing roller 30 and the transfer position X4.

Figure 3:
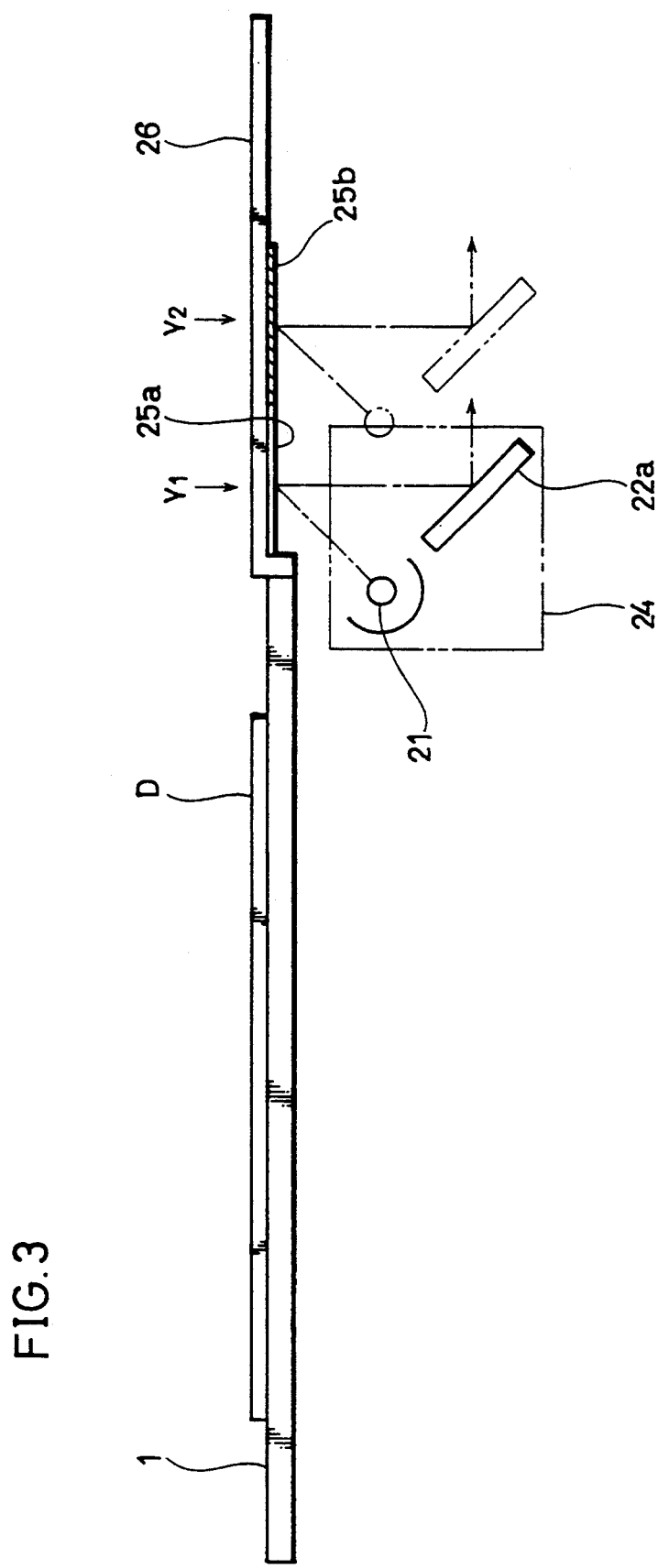
FIG. 3 is an enlarged view of a portion of the optical system shown in FIG. 2.

FIG. 3 is a diagram showing an enlarged portion of the optical system 20.

In copying operation, a slider unit 24 supporting an exposure lamp 21 and a mirror 22a is provided to be reciprocatable under the platen glass in order to exposure-scan the original D as described above, which is, in image adjustment as described-below, located at an adjusting position Y1 or Y2.

On the under side of a main body upper cover 26 of the copying machine A, seals for adjustment 25a and 25b are provided corresponding to the adjustment positions Y1, Y2. The seal 25a for adjustment has a reflectance corresponding to that of the background (white) of a normal original paper, and the seal 25b for adjustment has a reflectance corresponding to a gray background (half tone image).

Figure 4:
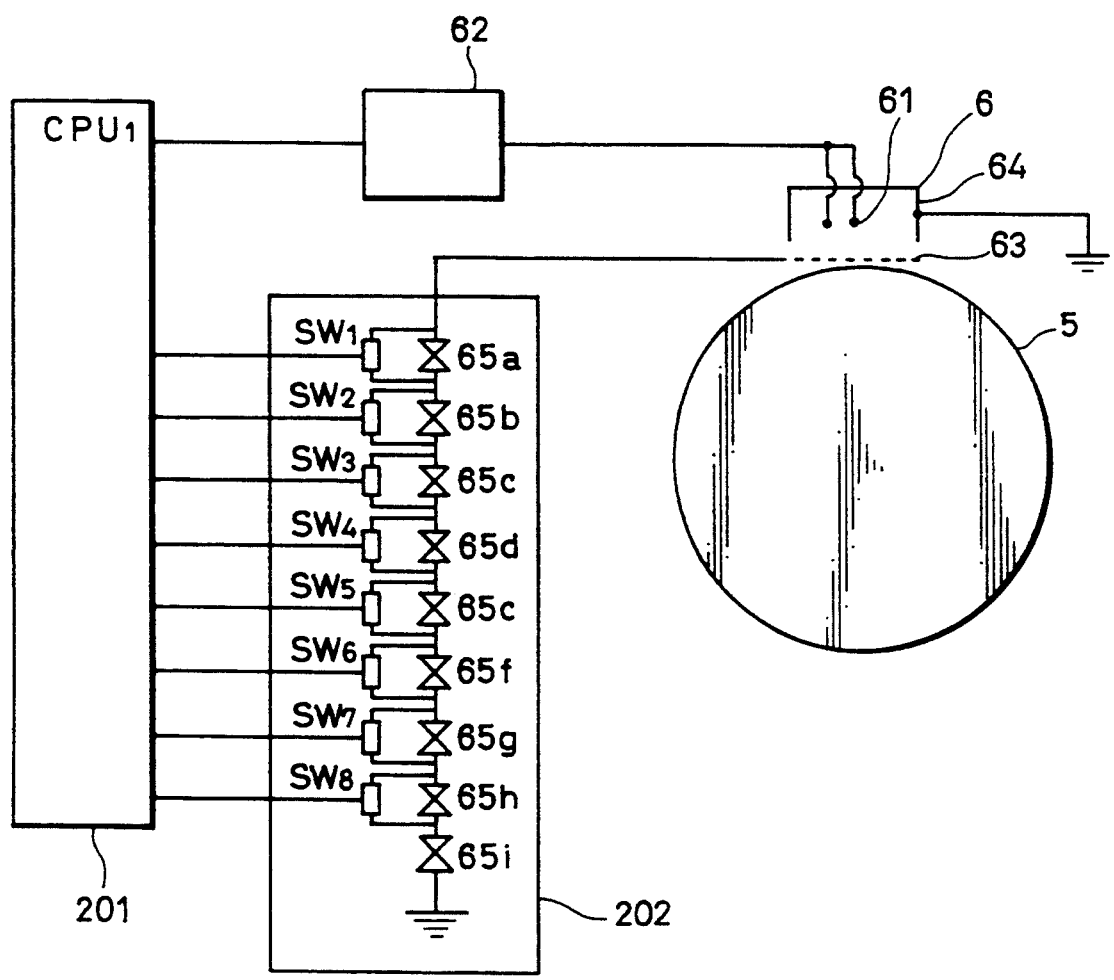
FIG. 4 is a diagram showing the structure of the transfer charger shown in FIG. 2 and an output circuit thereof.

FIG. 4 is a diagram showing a structure of corona charger 6 and output circuit 202.

Corona charger 6 is a Scorotron system and has a charge wire 61, a stabilization plate 64, and a mesh-like grid 63.

A predetermined high voltage is supplied to the charge wire 61 from a high voltage transformer 62 on/off controlled by a first CPU 201 described later. Grid 63 is grounded through varistors 65a–i connected in series in output circuit 202. Each of the terminals of each varistor 65a–h can be shorted by short switches SW1-8. By turning on and off each short switch SW1-8 with a control signal from the first CPU 201, the potential of grid 63 is controlled. Thus, the amount of charge directed to the surface of photoreceptor drum 5 from charge wire 61 is controlled for setting the surface potential of photoreceptor drum 5.

FIG. 5 is a diagram showing set levels of corona charger 6. In the present embodiment, the rated voltage of varistors 65a–h is set at 15 volts, and the rated voltage of varistor 65i is set at 790 volts. The surface potential of photoreceptor drum 5 can be set at 9 steps of the levels 1–9 at intervals of 15 volts around the reference level 5. For example, at the level 5, short switches SW1-4 are turned on to control the surface potential of photoreceptor drum 5 to be 650 volts. It is also possible to make rated voltages of varistors 65a–h different from each other to increase the number of levels.

In the description below, a set level of corona charger 6 is referred to as "HV level".

Figure 1:
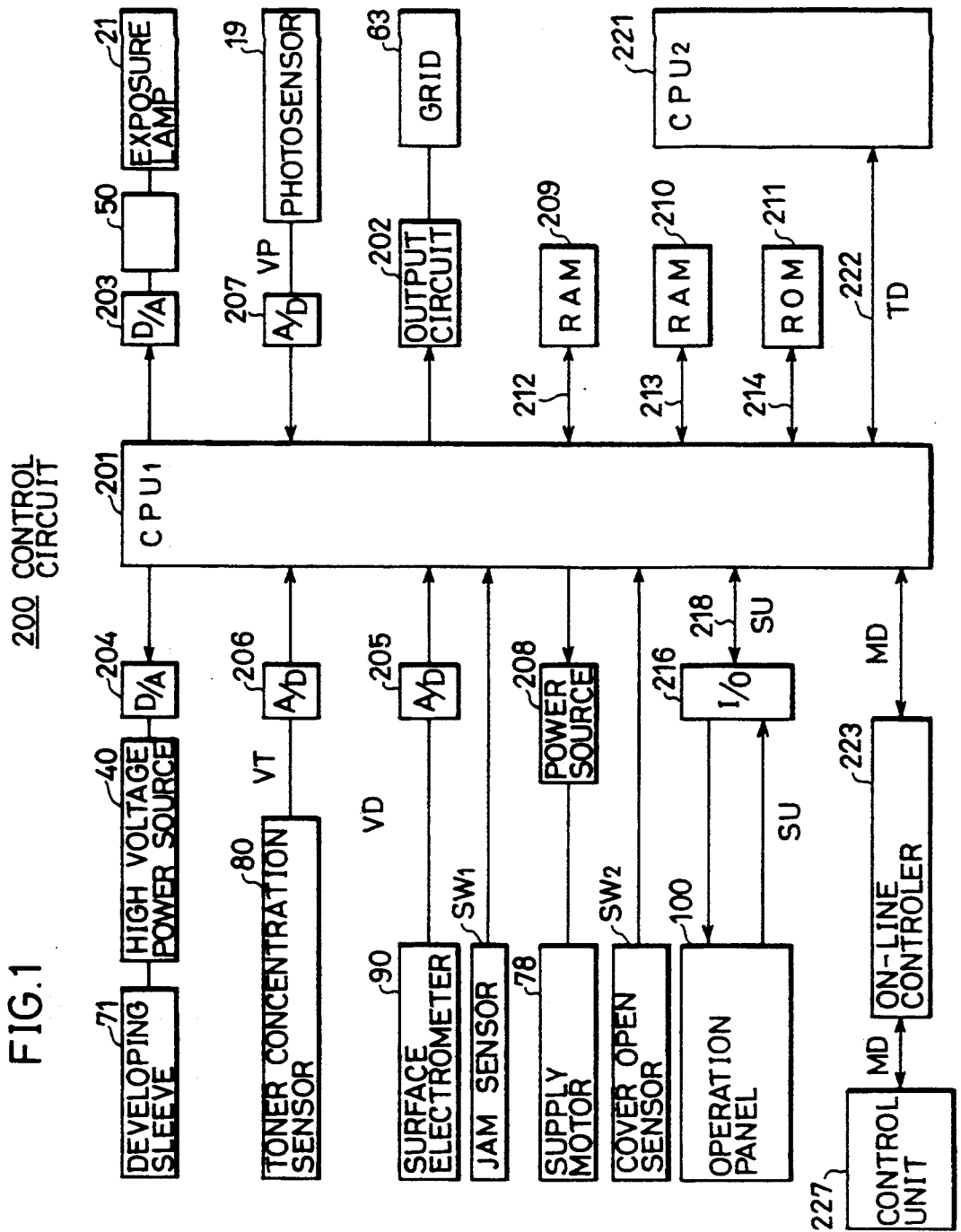
FIG. 1 is a block diagram of a copying machine of the first embodiment of the present invention.

FIG. 1 is a block diagram of a control circuit 200 of a copying machine A.

The control circuit 200 includes a first CPU 201 totally controlling the copying machine A, a second CPU 221 having a timer function, RAMs 209, 210, a ROM 211 and so forth. One RAM 209 is backed up by a main power source outside the figure and initialized when the main power source is turned off. The other RAM 210 is backed up by a battery, and the data written in the RAM 210 is held regardless of whether the main power source is on or off. Reference numerals 212 through 214 are data buses connecting the respective RAMs 209, 210 and ROM 211 and the first CPU 201.

An output voltage VD of the above-described surface electrometer 90, an output voltage VT of toner concentration sensor 80, and an output voltage VP of photosensor 19 are converted into digital signals through A/D converters 205-207, respectively, to be inputted to the first CPU 201. Control signals are supplied to exposure lamp power source 50 for lightening an exposure lamp 21 and a high voltage power source 40 for application of developing bias VB through D/A converters 203 and 204 from the first CPU 201. Power source 208 drives a supply motor 78, and an interface 216 transmits and receives data between an operation panel 100 described later and the first CPU 201.

Furthermore, to the first CPU 201, detection signals from jam sensor SW1 and a cover open sensor SW2 detecting that a cover of a main body of the copying machine A are opened for toner supply or the like are supplied.

An on line controller 223 communicates with an external control unit 227 described later.

Figure 9:
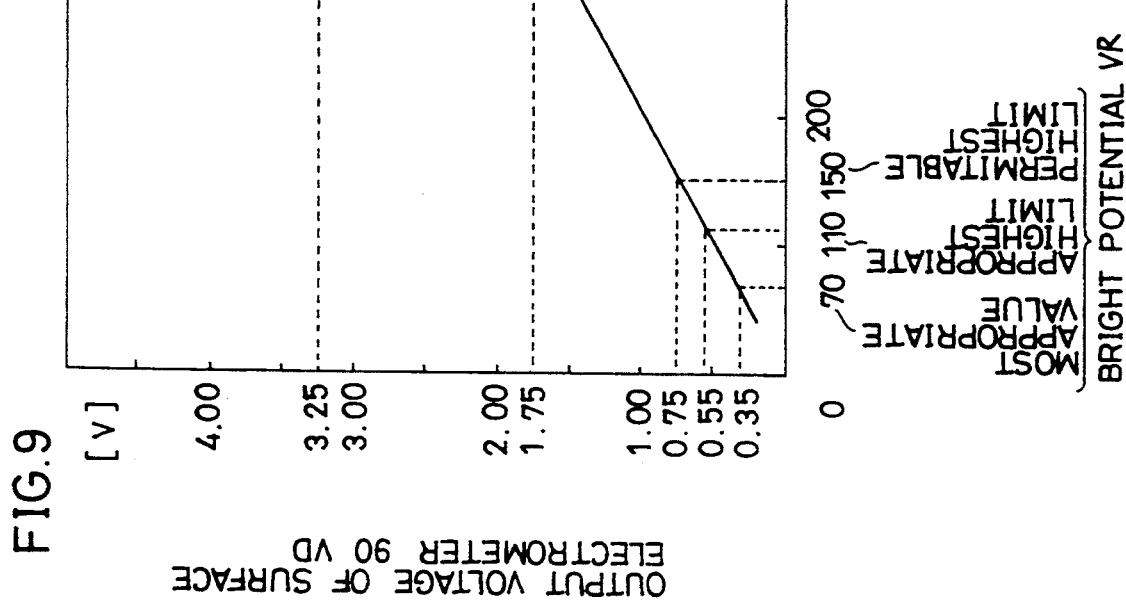
FIG. 9 is a graph showing relationship between the surface potential of a photoreceptor drum and the output voltage of a surface electrometer of the first embodiment of the present invention.

FIG. 9 is a graph showing relationship between the surface potential VH of photoreceptor drum 5 and the output voltage VD of surface electrometer 90.

As shown in the figure, if the surface potential VH is 70 volts, then the output voltage VD is 0.35 volt, and similarly if the surface voltage VH is 350 volts, the output voltage VD is 1.75 volts, and if the surface voltage VH is 650 volts, the output voltage VD is 3.25 volts. The values of 70, 350, 650 volts in the surface potential VH are reference values corresponding to the bright potential VR, the gray potential Vi, and the dark potential VO, respectively.

The bright potential VR corresponds to the portion discharged by exposure (a portion corresponding to a white portion of the original D), which does not attain 0 volts because of residual charge even in the best condition. The bright potential VR is proper when it is under or equal to 110 volts, and is not appropriate but not abnormal from 110 to 150 volts, and abnormal when it exceeds 150 volts. In the present embodiment, the potential in an exposed portion corresponding to the seal 25a for adjustment is expressed as the bright potential VR.

The gray potential Vi is a potential in an exposed portion corresponding to the seal 25b for adjustment, and the dark potential VO is a potential in a portion corresponding to a non-exposed portion (a black portion) on the surface of photoreceptor drum 5.

These gray potential Vi, dark potential VO, and developing bias VB are defined referring to the bright potential VR. That is, the most appropriate value corresponding to the reference electrophotographic process conditions defined on the basis of the shapes, materials and so forth of the above-mentioned photoreceptor drum 5 and developing device 7 and so forth can be expressed as the following expressions (1)–(3).

$$VB = VR + 150 \quad (1)$$

$$Vi = VB + 130 \quad (2)$$

$$VO = VB + 430 \quad (3)$$

FIG. 10 is a diagram showing set levels of the developing bias VB.

As shown in the expression (1), the difference between the developing bias VB and the bright potential VR of 150 volts is the most appropriate. If it is smaller than 150 volts, the toner sticks to an exposed portion (a portion where residual charge exists), or background contaminant is produced, and if it is larger than 150 volts, the magnetic carrier sticks.

Accordingly, in the present embodiment, in order to cope with the fluctuation of the bright potential VR, the developing bias VB can be set at 9 steps at intervals of 10 volts around the level 5 with a target value of a reference developing bias VB (220=70+150 volts). In the description below, a set level of the developing bias VB is referred to as "VB level".

Figure 6:
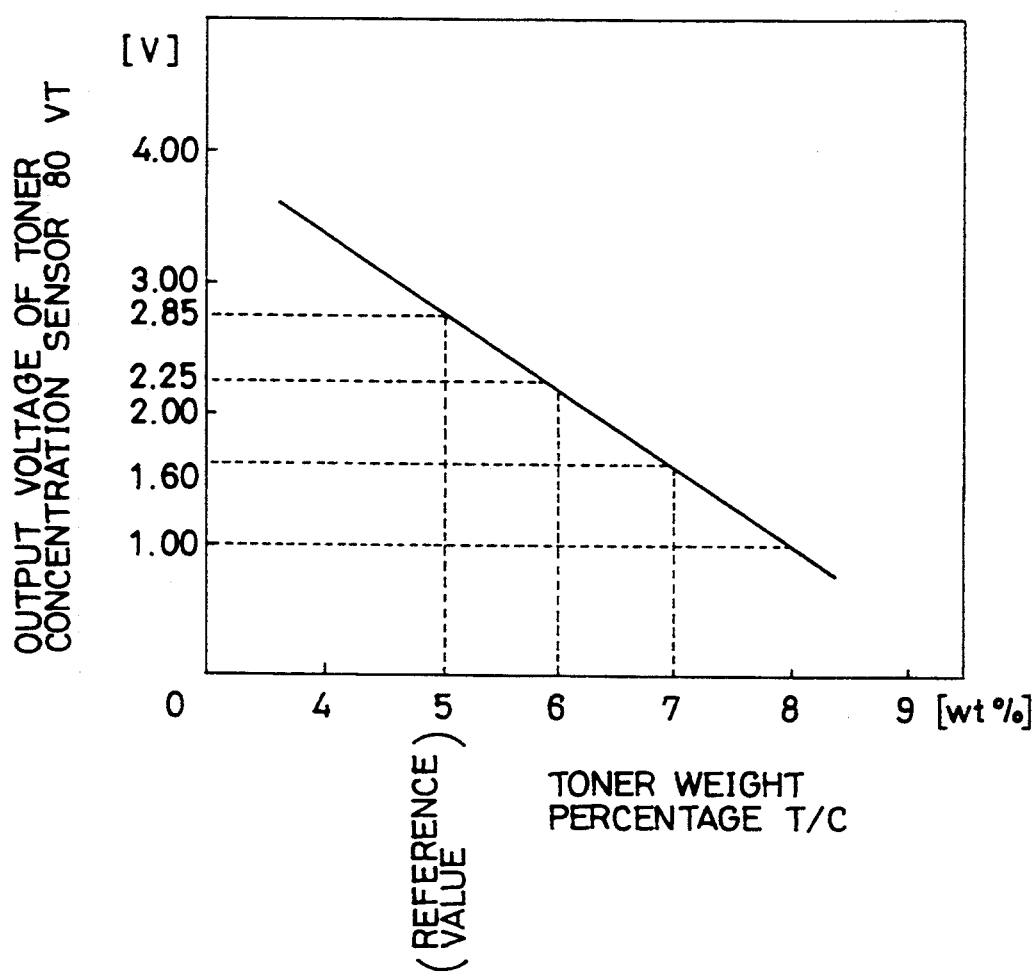
FIG. 6 is a graph showing relationship between toner weight percentage and an output voltage of a toner concentration sensor of the first embodiment of the present invention.

FIG. 6 is a graph showing relationship between the toner weight percentage T/C and an output voltage VT of toner concentration sensor 80.

A value of the toner weight percentage T/C of 5 [wt %] is defined as a reference electrophotographic process condition (a reference value), and then an output voltage VT of toner concentration sensor 80 is 2.85 volts. When carrying out copying operation with this reference value as a set value of the toner weight percentage T/C, the first CPU 201 compares the reference potential of 2.85 volts and the value of the output voltage VT. When the value of the output voltage VT is larger than "2.85", that is, when the toner weight percentage T/C is lower than the reference value, first CPU 201 turns on power source 208 of supply motor 78 to supply toner in order to make the toner weight percentage T/C closer to the reference value.

The toner weight percentage T/C is controlled to be held at a set value on occasion in copying operation, but a set value of the toner weight percentage T/C is changed on the basis of the self-diagnosis in image adjusting process described later.

FIG. 7 is a diagram showing relationship between set levels of the toner weight percentage T/C, and the dark potential VO and the gray potential Vi. In the present embodiment, a set value of the toner weight percentage T/C can be set at four steps of the levels 1 through 4. In the description thereafter, a set level of the toner weight percentage T/C is referred to as "T/C level".

Generally, as the value of the toner weight percentage T/C increases, the development efficiency increases, so that a hard copy image of appropriate density can be obtained by increasing the toner weight percentage T/C even when the potential difference between photoreceptor drum 5 and developing sleeve 71 is made small. Accordingly, in the image adjustment process described later, when output adjustment of corona charger 6 reaches its limit at the reference toner weight percentage T/C, or the T/C level "1", the T/C level is altered. If the toner weight percentage T/C exceeds 8 [wt %], however, excessive driving torque is applied to the bucket roller or so, and also problems are caused such as toner overflow from the developer tank 70, so that the upper limit value of the toner weight percentage T/C is defined as 8 [wt %].

FIG. 11 is a diagram showing set levels of amounts of exposure.

An amount of exposure is set by controlling a lighting power supplied from exposure lamp power source 50 to exposure lamp 21. In the copying machine A, 9 steps ranging from 1.6 to 2.4 [Lux.sec] around the level 5 with a target value of 2.00 [Lux.sec] are possible. A set level of the exposure amount is referred to as "EXP level" hereinafter.

Figure 8:
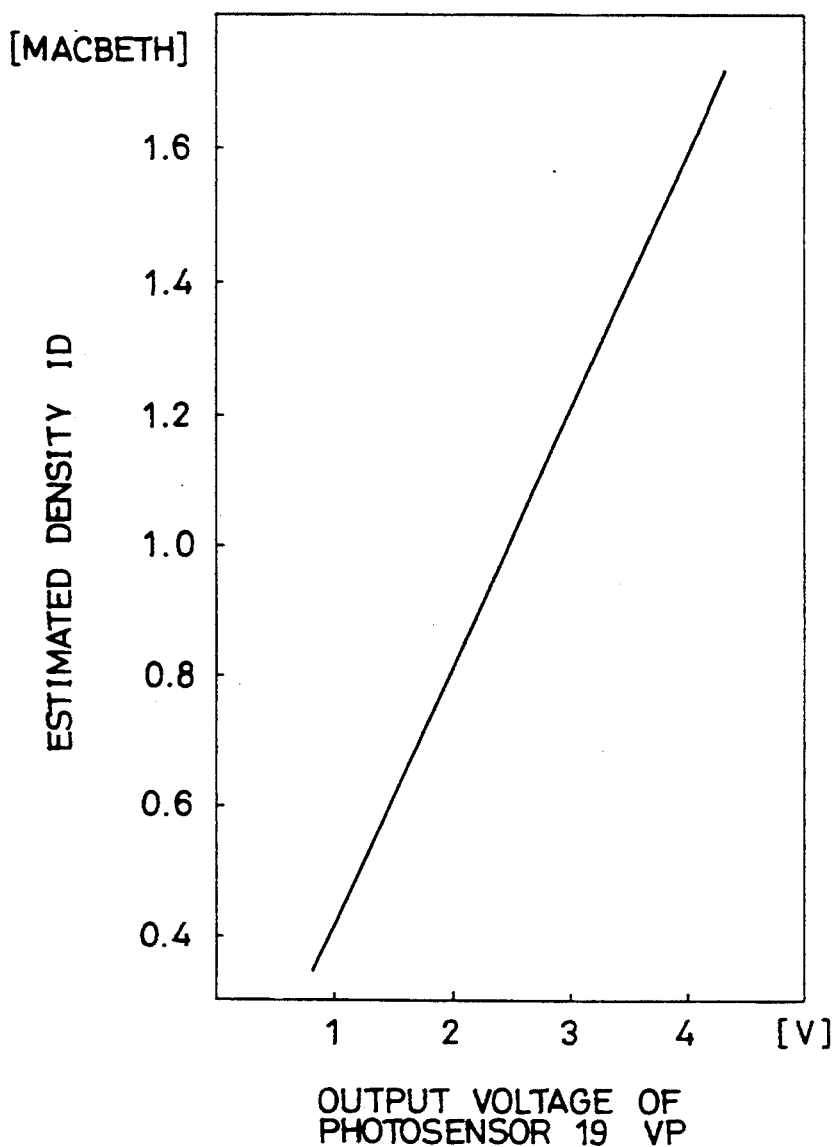
FIG. 8 is a graph showing relationship between the output voltage and the estimated density of a photosensor according to the first embodiment of the present invention.

FIG. 8 is a graph showing relationship between the output voltage VP of photosensor 19 and the estimated density ID.

The graph corresponds to the relationship between the density of a toner image on photoreceptor drum 5 and the density actually measured with respect to the hard copy image obtained by transferring and fixing the toner image on paper P. For example, if the output voltage VP is "2.5", the density of the formed hard copy image can be estimated to be 1.0 [Macbeth]. The graph data GD is stored in ROM 211 in advance.

The first CPU 201, referring to the data of ROM 211, calculates an estimated density ID of a hard copy image formed in copying operation on the basis of an output voltage VP of photosensor 19. That is, on the basis of the density of a toner image (a reflectance of a toner image) which is one of the elements in an electrophotographic process, the density of a hard copy image which an operator will see is estimated.

Figure 12A:
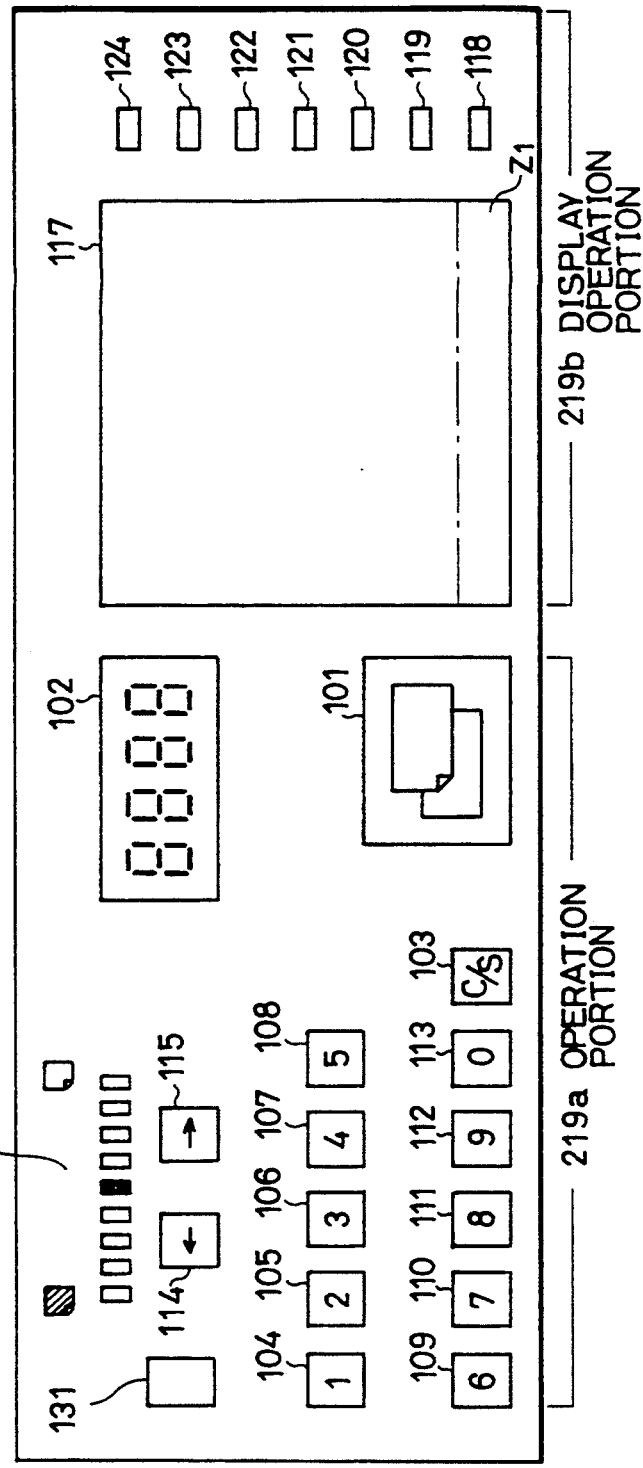
FIG. 12A is a plan view of an operation panel of a copying machine of the first embodiment of the present invention.

FIG. 12A is a plan view showing one example of an operation panel 100 of the copying machine A.

Operation panel 100 is divided into an operation portion 219a for setting copying conditions such as the number of copies and density, and a display operation portion 219b relating to display of condition in each portion.

In operation portion 219a, there are a print key 101 for starting copying operation, 7 segment LED 102 for displaying the number of copies or so, ten keys 104 through 113 respectively corresponding to numbers of 1, 2, ... 9, 0, clear stop key 103 for releasing setting of copying conditions, up and down keys 114, 115 for altering and setting the copied image density step-by-step, a density display portion 116 for displaying the copied image density, a claim key 131, and so forth. The claim key 131 is provided for occurrences of degradation of image quality, which is employed when an operator is not satisfied with image quality.

In display operation portion 219b, there are a message display portion 117 formed of liquid crystal display, and keys for a service man 118-124.

Figure 12B:
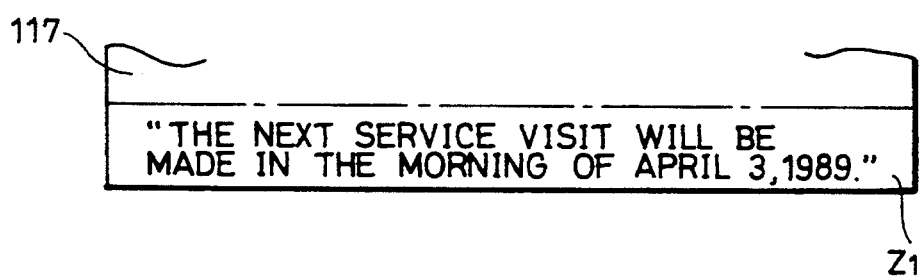
FIG. 12B is a diagram showing one example of displayed contents displayed in the message display portion of FIG. 12A.

FIG. 12B shows one example of display of the message display portion 117. The keys for service men 118 through 124 are mainly used for maintenance by a service man such as display operation of the information stored in RAM 210 and data processing operation.

Claim key 131, and keys for a service man 118-124 may be overspread with a cover or may be provided in a main body not to be operated in a normal condition.

Figure 13:
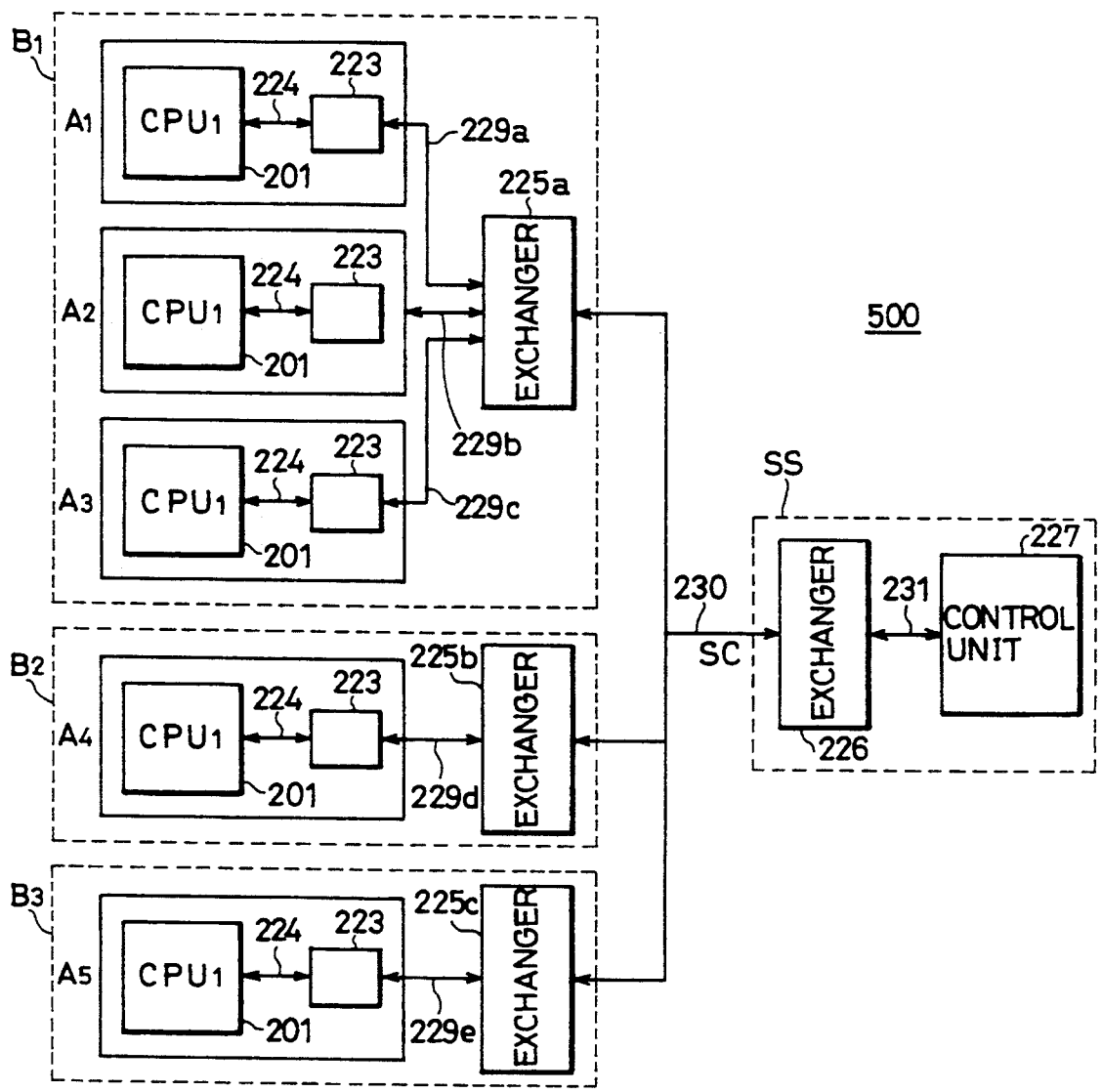
FIG. 13 is a block diagram showing a schematic structure of a control net work system according to the first embodiment of the present invention.

FIG. 13 is a block diagram showing a structure of a control net work system 500.

In the control net work system 500, five copying machines A1-A5 of the same type provided at a user and a control unit 227 at a service station SS are made on-line using a telephone line 230. Copying machines A1-A3 are provided in a building B1 in which an extension network is structured with an automatic exchanger 225a and internal lines 229a through c. The copying machines A4 and A5 are provided in buildings B2 and B3, respectively, and connected to a telephone line 230 through automatic exchanges 225b and 225c.

Figure 14:
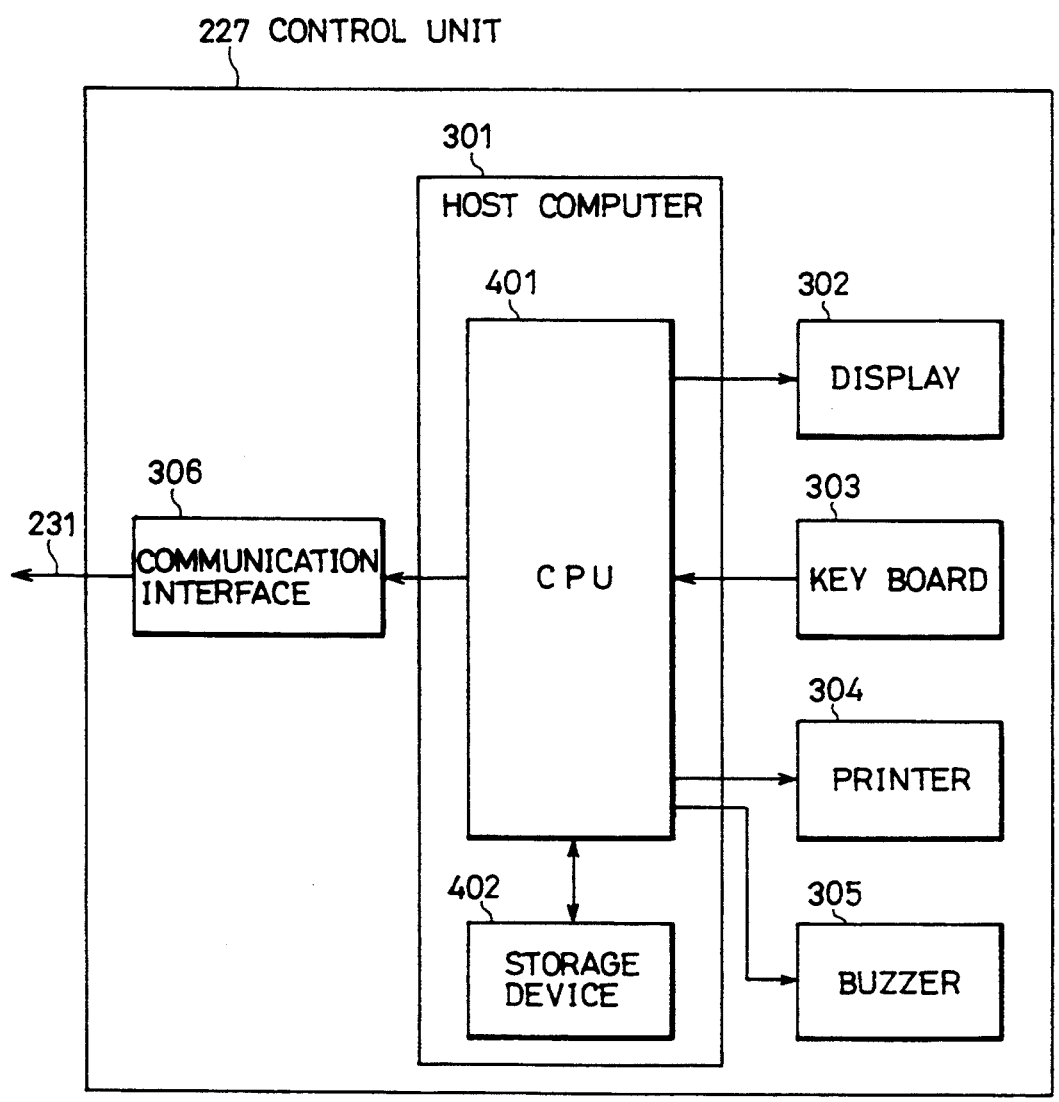
FIG. 14 is a diagram showing an internal structure of the control unit of FIG. 13.

FIG. 14 is a block diagram of control unit 227. The control unit 227 includes a host computer 301 carrying out various kinds of processes according to software for maintenance, a display 302 for displaying, a key board 303 as an operation input means, a printer 304 for printing, a buzzer 305 for informing a service man of abnormality in the above-mentioned each copying machine A1-A5, and a communication interface 306 for communicating with each copying machine A1-A5. Host computer 301 includes a CPU 401 for controlling the entire control unit 227, and a storage device 402 provided with a schedule table ST described below. A schedule table ST is sometimes simply referred to as "table ST" hereinafter.

FIG. 15 is a diagram showing contents of communication in the control net work system 500.

In the control net work system 500 configured as described above, a user can make a contact with a service station SS for demanding a service visit.

That is to say, if a claim key 131 is pushed down in any of copying machines A1-A5, a claim signal SU is supplied to the first CPU 201 through an interface 216 from an operation panel 100 in that copying machine A. In this way, the image adjusting process for self-diagnosing a condition in each portion of the copying machine A for adjusting a set value of each portion, and the data transmission process in which maintenance data MD including set values adjusted by the image adjustment process, other information indicating operation condition of the copying machine A and pushdown of claim key 131 is transmitted to control unit 227 through the telephone line 230, are carried out.

Control unit 227, receiving the maintenance data MD, displays the same with the display device 302 and prints it out with printer 304 simultaneously.

Thus, a service man can receive a demand of a service visit, and simultaneously can conform conditions of a copying machine A for which a demand of service visit is made while staying at the service station SS.

In control net work system 500, each copying machine A1, ..., A5 can be remote-controlled from the service station SS.

That is, a service man can call a specific copying machine A through telephone line 230 and transmit an adjustment command signal SF by input operation of key board 303 in order to have it operate for maintenance.

In the copying machine A, upon reception of the command signal SF, as operation for maintenance, the above-described image adjusting process and data transmission process are performed.

Upon reception of maintenance data MD from each copying machine A1-A5, control unit 227 sets the next service visit date SV with respect to each copying machine A1-A5 on the basis of the maintenance data MD as will be described later and transmits service visit data SD formed of a service visit date SV and a display command signal SI to the corresponding copying machine A1-A5. A copying machine among the copying machines A1-A5 from and to which maintenance data MD and service visit data SD are transmitted and received is referred to as "copying machine A" hereinafter.

Next, operation of a copying machine A will be described according to flow charts of FIGS. 16A and 16B through 19.

Figure 16A:
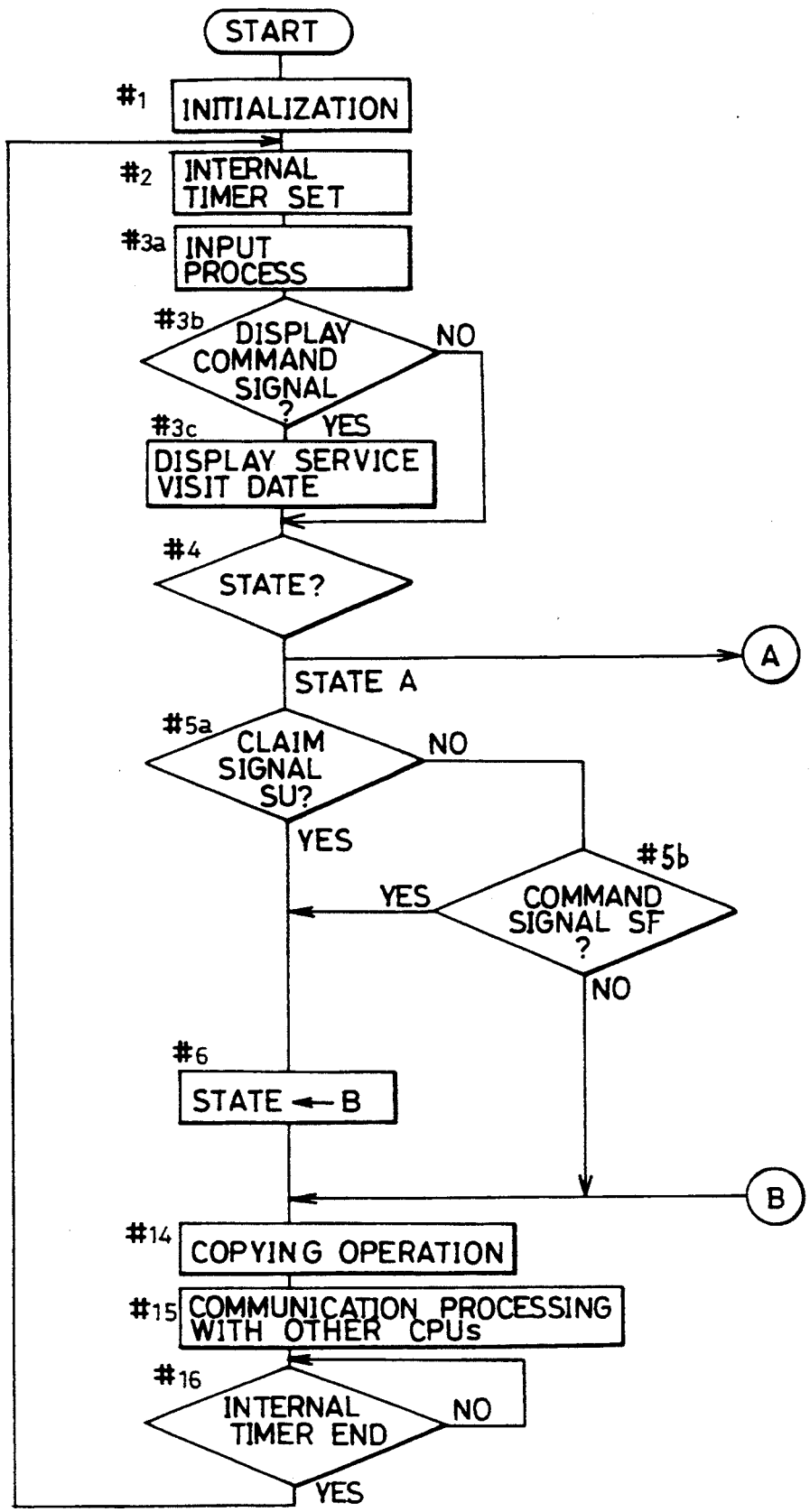
FIGS. 16A and 16B are flow charts showing a main routine of a first CPU according to the first embodiment of the present invention.
Figure 16B:
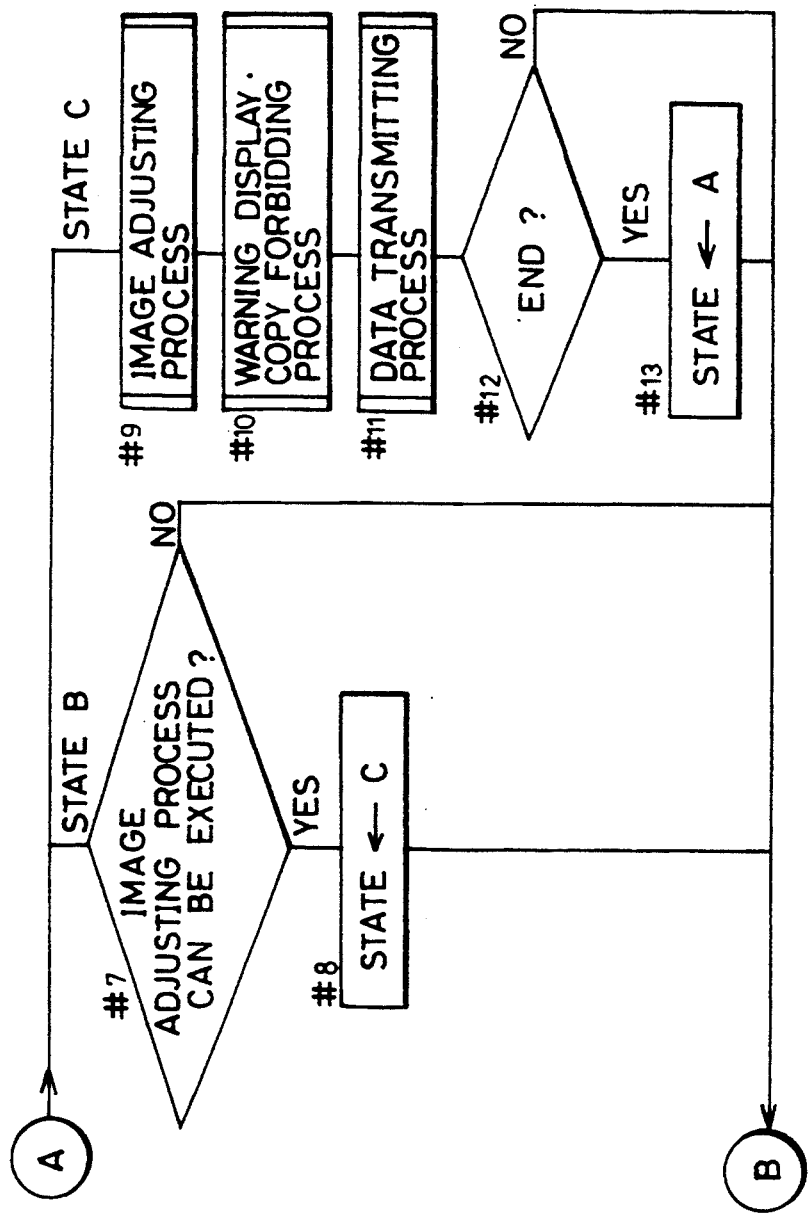

FIGS. 16A and 16B are main flow charts schematically showing operation of the first CPU 201.

The program starts upon turning-on of a power source, initialization in each portion is performed in step #1, and an internal timer is set for defining a length of 1 routine of the first CPU 201 in step #2.

In step #3a, an input process for receiving signals from an operation key of operation panel 100, sensors and switches in respective portions is carried out.

Next, in step #3b, a check is made to see if a display command signal SI is supplied as an input from control unit 227 or not.

If it is YES in step #3b, a message Z1 for notifying an operator of the next service visit date is displayed in the message display portion 117 of operation panel 100 on the basis of the service visit date SV transmitted from control unit 227 as shown in FIG. 12B in step #3c.

Next, a check is made for a state in step #4, and the following processes are carried out according to the state. The state is set at "B" in initialization in step #1.

In the state "A", a determination is made as to whether a claim signal SU is inputted or not in step #5. If a claim signal SU is not inputted, it is checked if an adjusting command signal SF is inputted or not in step #5b.

If a claim signal SU or an adjustment command signal SF is inputted, it proceeds to step #6, and the state is made "B".

In the state "B", in step #7, a check is made to see if image adjusting process can be carried out or not. During copying operation, in occurrence of a fault, when jam is produced or a body cover is opened for toner supply or so, a determination is made that image adjusting process should be forbidden, and it proceeds to step #14. In this case, the process in step #8 is immediately performed at the point at which the above problems are solved.

If it is YES in step #7, the state is made "C" in step #8.

In the state "C", an image adjusting process (step #9), and a warning display, a copying forbidding process (step #10), a data transmission process (step #11) are sequentially carried out, and after confirming that the processes in steps #9–#11 have been completed in step #12, the state is returned to "A" in step #13.

Subsequently, copying operation (step #14), and communication process with other CPUs (step #15) are carried out and it returns to step #2 upon end of the internal timer in step #16. When the power source is on, the processes of steps #2–#16 are repeated.

Figure 17A:
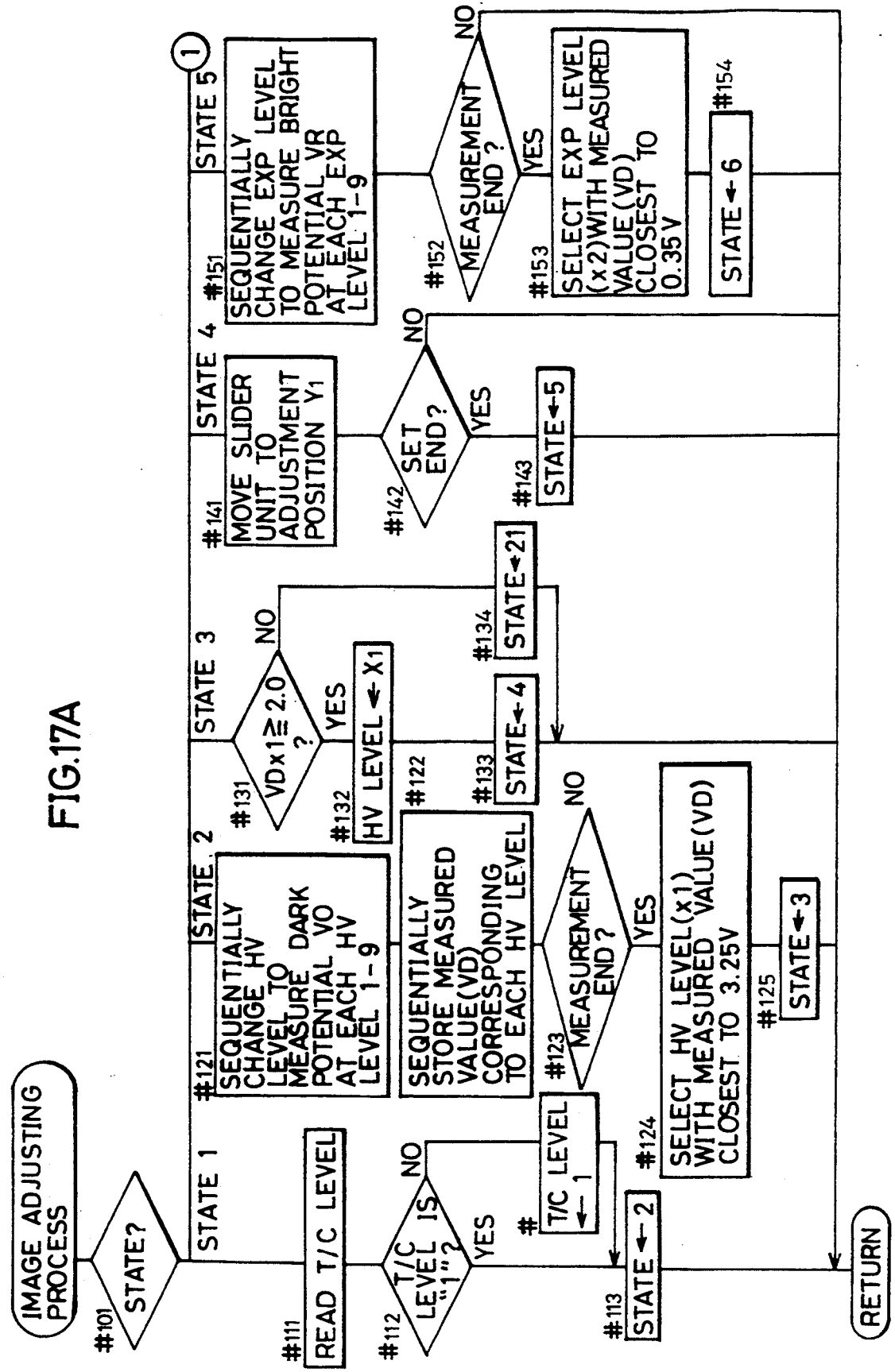
FIGS. 17A to 17E are flow charts showing specific contents of the image adjusting process of FIG. 16B.
Figure 17B:
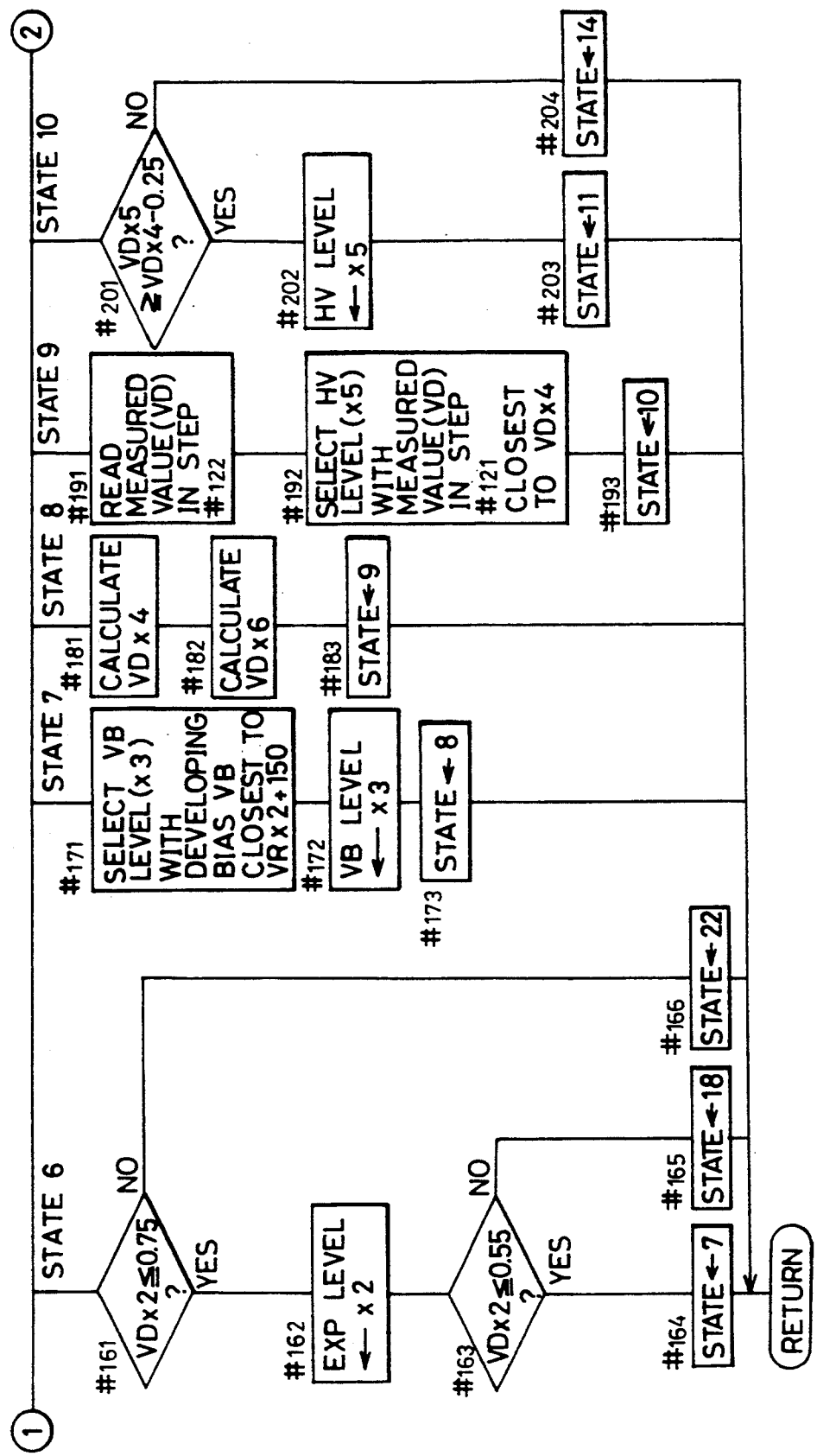
Figure 17C:
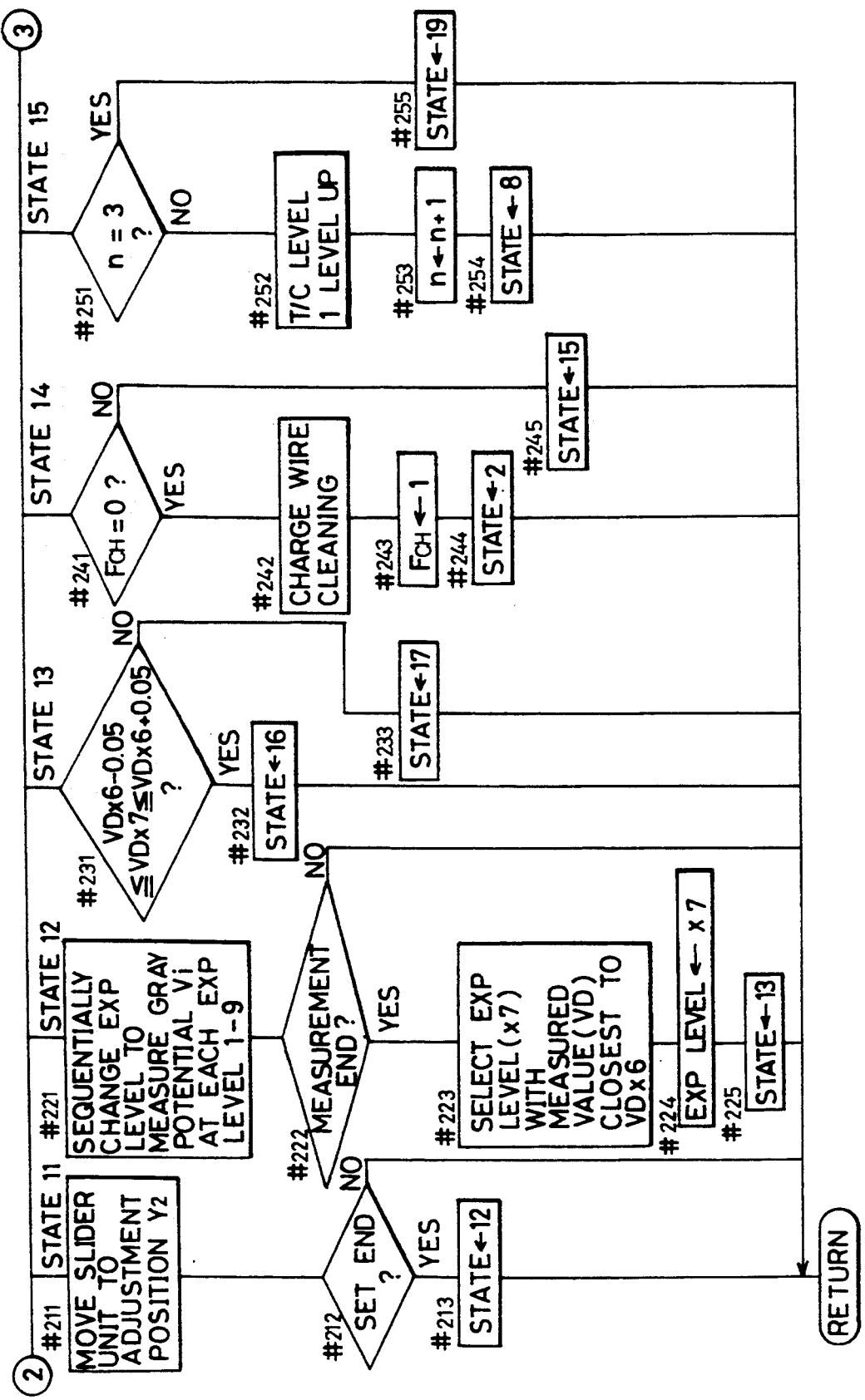
Figure 17D:
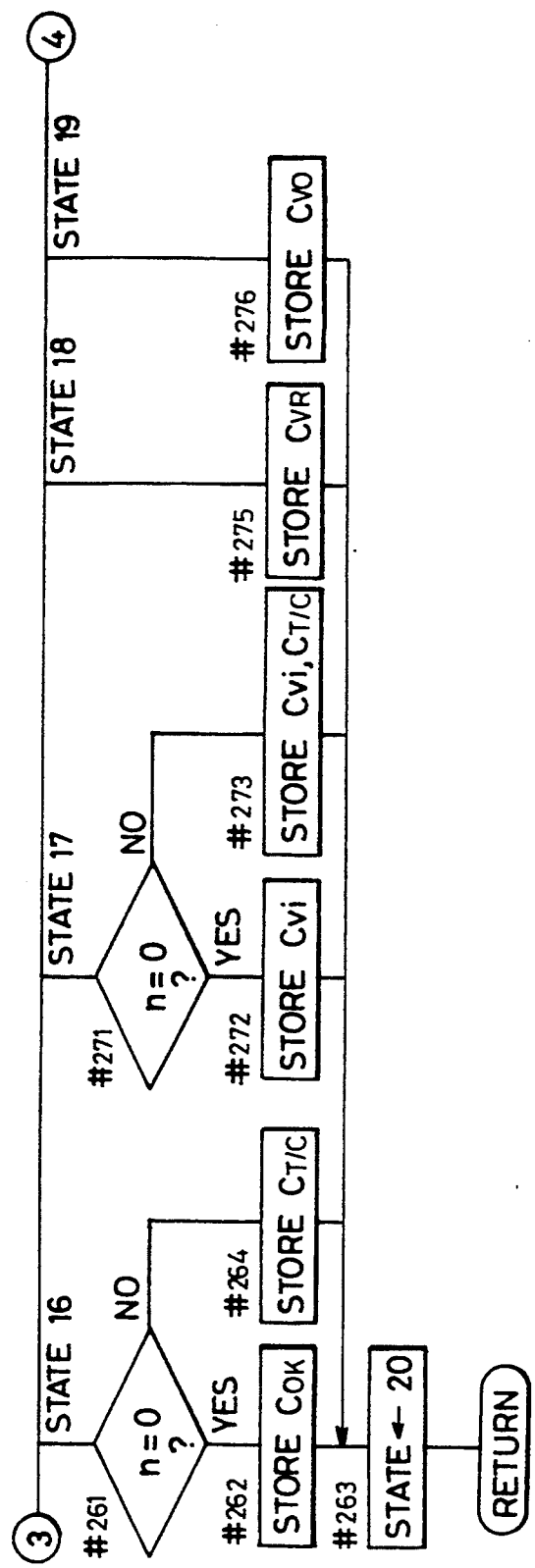
Figure 17E:
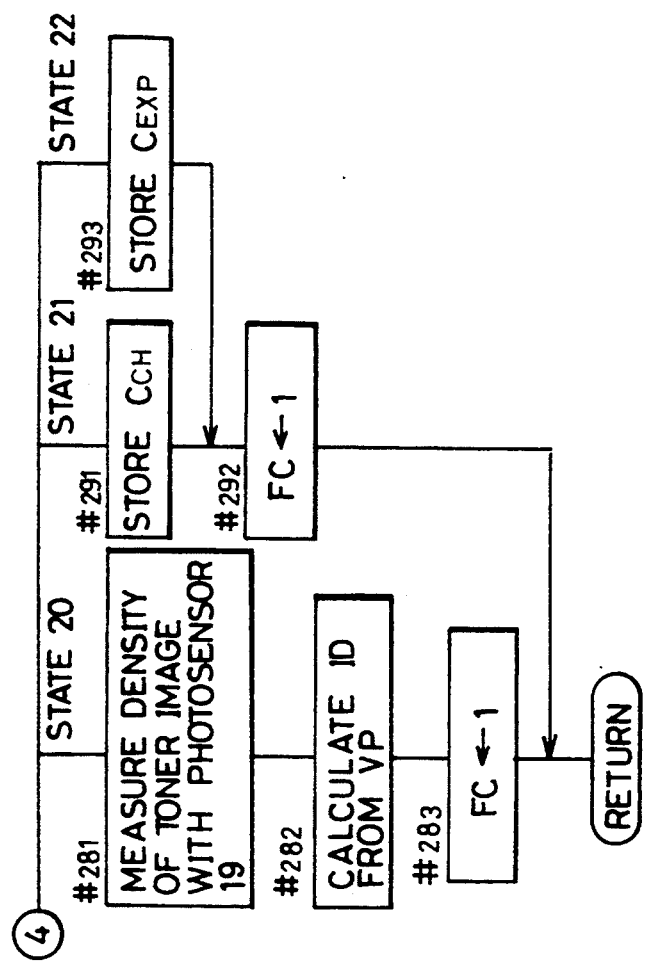

FIGS. 17A–17B, and 16B are flow charts of the image adjusting process of step #9.

This routine includes a setting process (state "1" to state "15") for image adjusting in which setting operation is performed with respect to each device around photoreceptor drum 5 and a condition storage process (state "16" to state "22") for storing condition data indicating condition in each portion obtained by the self-diagnosis, on the basis of self-diagnosis for determining in which operation condition the copying machine A is, i.e., an appropriate condition in which an image can be formed under reference setting, an inappropriate condition in which an image can be formed but its quality might be degraded, and an abnormal condition in which image can not be formed.

In the routine, a state is checked first in step #101, and the following processes are carried out according to the state.

In the state "1", the present T/C level is read out from RAM 209 in step #111. A determination is made as to whether the T/C level is "1" or not, or it is set at a reference T/C level or not (step #112), and if it is YES, the state is made "2" in step #113. If it is NO in step #112, the T/C level is set at "1" in step #114.

In the state "2", with an exposure lamp 21 being off, in step #121, corona charger 6 is turned on and photoreceptor drum 5 is rotated, the HV level is sequentially altered to measure the dark potential VO at each HV level "1" through "9".

In step #122, measured values VD at respective HV levels measured in step #121 are sequentially stored, and a determination is made as to whether measurement with respect to all the HV levels "1"–"9" has been completed or not.

If it is YES in step #123, in step #124, a HV level "x1" (one of HV levels "1"–"9") with a measured value in step #121, or a value of the output voltage VD of surface electrometer 90 closest to 3.25 volts corresponding to a reference value of dark potential VO (650 volt) is selected. Then, a state is made "3" (step #125).

In the state "3", in step #131, a check is made whether a value "VDx1" of an output voltage VD in the HV level "x1" selected in the previous state "2" is more than or equal to 2.0 volts or not. That is to say, a determination is made as to whether the dark potential VO is no less than the lower limit value (400 volts) for enabling copying operation or not. If it is YES in step #131, in step #132, a HV level "x1" is set as a temporary HV level.

If it is NO in step #131, it means that a serious trouble such as cut-off of charge wire 61 of corona charger 6 and so forth has occurred so that the copying operation is impossible. That is, the operation condition of the copying machine A is abnormal. In this case, the state is made "21" (step #134).

In the state "4", the slider unit 24 of the optical system 20 is moved to the above-mentioned adjusting position Y1 (step #141), confirming completion of setting the slider unit 24 (step #142), and the state is made "5" (step #142).

In the state "5", first, in step #151, with exposure lamp 21 lightened, seal for adjustment 25a is irradiated as the EXP level is sequentially altered to measure bright potential VR at each EXP level "1"–"9".

In step #152, completion of measuring each EXP level is confirmed, and in step #153, an EXP level "x2" with an output voltage VD value of surface electrometer 90 which is a measured value in step #151 closest to 0.35 volt corresponding to the reference value of the bright potential VR (70 volts) is selected. Then, the state is made "6" (step #154).

In the state "6", in step #161, a check is made whether the value of the output voltage VD "VDx2" at the EXP level "x2" is no more than 0.75 volt or not. That is, a determination is made as to whether the bright potential VO is lower than or equal to the upper limit value (150 volts) for enabling copying operation or not.

If it is NO in step #161, it means that a trouble such as a fault of exposure lamp 21 or so has occurred, and copying operation is impossible. That is, the operational condition of the copying machine A is abnormal. In this case it proceeds to step #166 and the state is made "22".

If it is YES in step #161, in step #162, a temporary EXP level "x2" is set.

In the following step #163, a determination is made as to whether the actually measured value "Vdx2" is no more than 0.55 volts or not.

If it is YES in step #163, a developing bias VB satisfying the above-cited expression (1) can be set to form a copied image with appropriate quality. The operational condition of the copying machine A is appropriate. In this case, the state is made "7" in step #164.

If it is NO in step #163, copying operation is possible but a developing bias VB satisfying the expression (1) can not be set even if the VB level "9" which is a limit of adjustment is selected, so that there is a fear that the image quality of the copied image is degraded. Accordingly, the operational condition of the copying machine A is an inappropriate condition. In this case, the state is made "18" (step #165).

In the state "7", a developing bias VB which is one of the electrophotographic process conditions is determined.

That is, a value of bright potential VR "VRx2" corresponding to the above-mentioned actually measured value "Vdx2" is calculated, a VB level "x3" of a target value of the developing bias VB becomes the closest to "Vrx2+150" volt is selected (step #171), and a VB level "x3" is set as a VB level (step #172). For example, if an actually measured value "Vdx2" is 0.35 volt, the value of bright potential VR corresponding to this is the most appropriate value 70 volt (see FIG. 9), and a VB level "5" with a target value of 220 (70+150) volts is set (see FIG. 10). Then, the state is made "8" in step #173.

In the state "8", first, in step #181, a calculation value of an output voltage VD "VDx4" corresponding to a target value "VOx4" of dark potential VO is calculated by inserting the value "VBx3" of the developing bias VB at the VB level "x3" into the expression (3).

Next, in step #182, a value "Vbx3" is inserted into the expression (2) to calculate a calculate value of the output voltage VD "VDx6" corresponding to the target value of gray potential Vi "Vix6". Then, the state is made "9" in step #183.

In the state "9", the measured value VD stored in step #122 of the above-mentioned state "2" is read out (step #191), the HV level "x5" of a measured value VD the closest to the calculation value "Vdx4" is selected (step #192), and the state is made "10" (step #193).

In the state "10", first, in step #201, it is confirmed whether an actual dark potential VO is a value in an appropriate range defined according to a target value obtained by calculation or not. That is, it is checked whether relationship between the actually measured value "VDx5" of output voltage VD corresponding to the HV level "x5" and the calculation value "Vdx4" satisfies the expression (4) below or not.

$$Vdx5 \geq Vdx4 - 0.25[V] \tag{4}$$

The difference of 0.25 volt in the output voltage VD can be expressed as difference of 50 volt when it is converted into the surface potential VH.

If it is YES in step #201, the dark potential VO is appropriate, so that the HV level "x5" is set as HV level (step #202), and the state is made "11" (step #203).

If it is NO in step #201, the state is made "14" in step #204. In this case, the dark potential VO is lower than an appropriate value and the operational condition is non-appropriate condition. If copying operation is carried out in this non-appropriate condition, a light image is formed because the amount of sticking toner is too small.

In the state "11", slider unit 24 is shifted to the adjustment position Y2 (step #211), confirming completion of setting slider unit 24 (step #212), and the state is made "12" (step #213).

In the state "12", first, in step #221, with exposure lamp 21 lightened, seal for adjustment 25b is irradiated with the EXP level sequentially altered, gray potential Vi at each EXP level "1"–"9" is measured, and completion of measuring with respect to all the EXP levels is confirmed in step #222.

Next, the EXP level "x7" with a value of the output voltage VD which is a measured value in the previous step #221 the closest to the above-mentioned calculated value "Vdx6" is selected (step #223), and an EXP level "x7" is set as an EXP level (step #224). Then, the state is made "13" in step #225.

In the state "13", in step #231, it is confirmed whether an actual gray potential Vi is in an appropriate range (Vix6±10 volt) defined according to the target value "Vix6" obtained by calculation or not. That is, it is checked as to whether the relationship between an actual measured value "VDx7" of the output voltage VD corresponding to the EXP level "x7" and the calculated value "Vdx6" satisfies the expression (5) below or not.

$$Vdx6 - 0.05 \leq Vdx7 \leq Vdx6 + 0.05[V] \tag{5}$$

If it is YES in step #231, the gray potential VO is appropriate, it proceeds to step #232 and the state is made "16".

If it is NO in step #231, the gray potential VO is inappropriate, and the state is made "17" in step #233.

The state "14" is carried out when a determination is made that the dark potential VO is inappropriate in the above-mentioned state "10". In step #241, it is determined as to whether a charger flag $F_{CH}$ indicating a cleaning condition of charge wire 61 is "0" or not.

If it is YES in step #241, the charge wire 61 is not cleaned, and the cause of the inappropriate dark potential VO is estimated to be contaminant of charge wire 61. Accordingly, in step #242, the charge wire 61 is cleaned. Subsequently, in step #243, the charger flag $F_{CH}$ is set at "1", and the state is made "2" in step #244. Accordingly, if it is YES in step #241, with charge wire 61 cleaned, each process after the state "2" is performed again.

If it is NO in step #241, it means that an appropriate dark potential VO is not obtained in spite of charge wire 61 has been already cleaned. In this case, the state is made "15" in step #245.

In the state "15", first, in step #251, a check is made to see if the number n of altering the T/C level is "3" or not.

If it is NO in step #251, it proceeds to step #252 to up the T/C level by 1 level. That is, setting of the T/C level is altered to increase the toner weight percentage T/C. For example, if the present setting is T/C level "1", it is changed to the T/C level "2". Next, in step #253, the number n of alteration is made to be a value obtained by adding 1 to the present value, and the state is made "8" in step #254.

Accordingly, if it is NO in step #251, as shown in FIG. 7, each target value of the dark potential VO and the gray potential Vi corresponding to the new T/C level is calculated and the HV level and the EXP level are set so that an appropriate image can be obtained on the basis of the target values.

If it is YES in step #251, it means that the T/C level "4" is set as a T/C level, since the adjustment limit of the T/C level has already been reached, the T/C level is not altered, and the state is made "19" in step #255.

In the state "16", in step #261, a check is made to see if the number n of altering is "0" or not. If it is YES in step #261, a reference T/C level "1" is set as a T/C level, so that the condition data $C_{OK}$ indicating that the T/C level is appropriate is stored in step #262. The storage in the routine is made by storing data in RAM 209.

If it is NO in step #261, in step #264, the condition data $C_{T/C}$ indicating that T/C level is inappropriate is stored. After step #262 or step #264, the state is made "20" in step #263.

In the state "17", in step #271, a check is made to see if the number n of altering is "0" or not, and if it is YES, the condition data $C_{Vi}$ indicating that the gray potential Vi is inappropriate is stored (step #272), and if it is NO, the condition data $C_{Vi}$ and the condition data $C_{T/C}$ are stored (step #273). After step #272 or step #273, it proceeds to the above-mentioned step #263.

In the state "18", the condition data $C_{VR}$ indicating that the bright potential VR is inappropriate is stored (step #275).

In the state "19", the condition data $C_{VO}$ indicating that the dark potential VO is inappropriate is stored (step #276).

In the state "20", the process for estimating density of a hard copy image under the electrophotographic process conditions set as described above is carried out.

That is, in step #281, the densities of three kinds of toner images are measured by photosensor 19, i.e., a toner image formed with exposure lamp 21 being put off (a toner image corresponding to black), a toner image formed with exposure lamp 21 being lightened at the adjustment position Y1 (a toner image corresponding to white), and a toner image formed with exposure lamp 21 being lightened at the adjustment position Y2 (a toner image corresponding to gray).

Next, in step #282, on the basis of the output voltage VP of photosensor 19 and the graph data GD1 stored in ROM 211, a calculation is made to obtain an estimated density ID of the hard copy image to calculate estimated density data $ID_O$, $ID_R$, $ID_i$ with respect to three kinds of hard copy images, black, white and gray, respectively.

Subsequently, in step #283, an image adjustment completion flag FC for showing that setting to each device around photoreceptor drum 5 has been completed is set at "1".

In the state "21", in step #291, on the basis of the self-diagnosis at the above-mentioned state "3", condition data $C_{CH}$ indicating that the corona charger 6 is in an abnormal condition is stored. Then, in step #292, the image adjustment completion flag FC is set at "1".

In the state "22", on the basis of the self-diagnosis in the above-mentioned state "6", the condition data $C_{EXP}$ showing that exposure lamp 21 is in an abnormal condition is stored (step #293), and it proceeds to the above-mentioned step #292.

Figure 18:
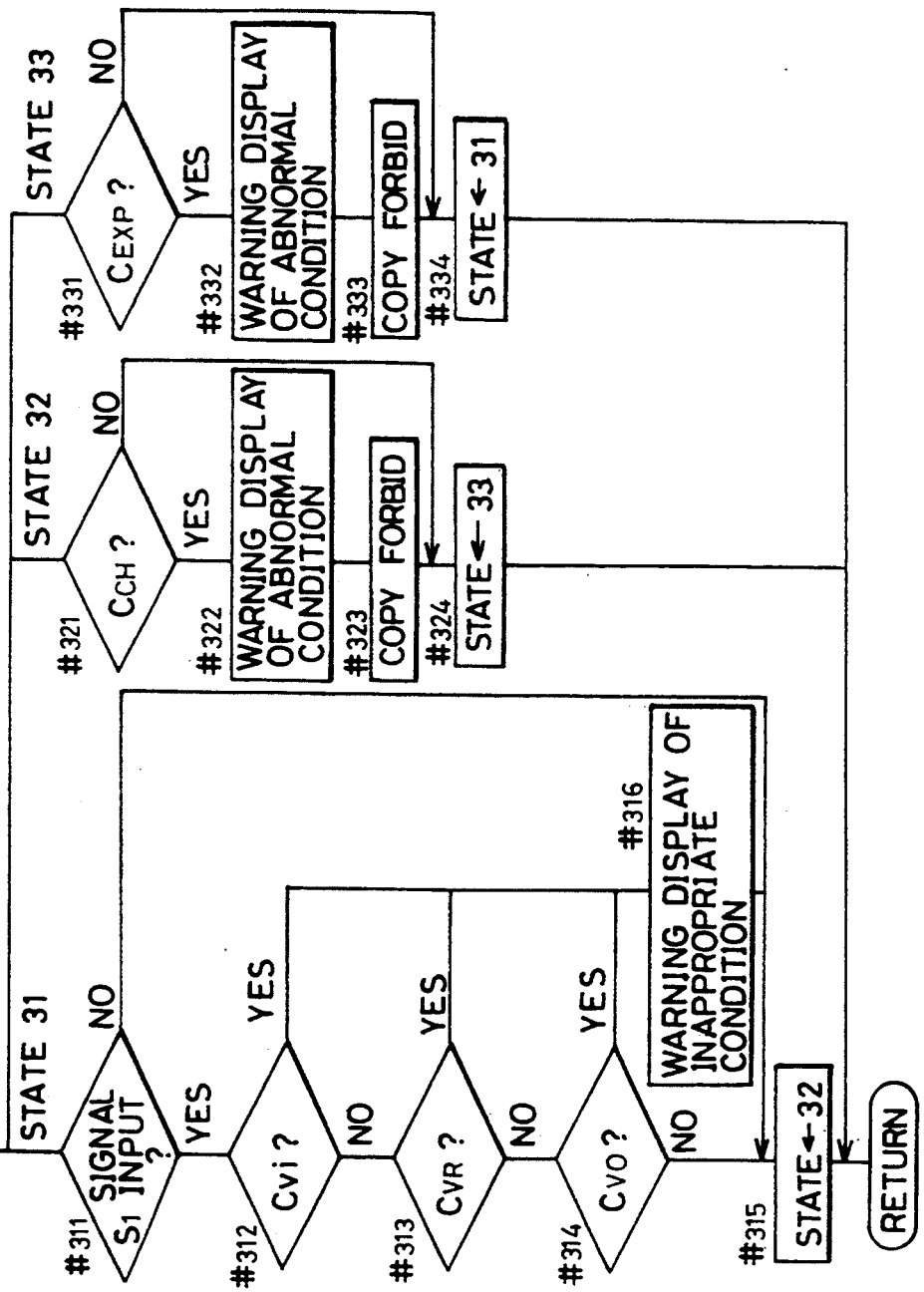
FIG. 18 is a flow chart showing specific contents of the warning display and the copying prohibition process.

FIG. 18 is a flow chart of warning display and copying forbidding process of step #10 in FIG. 16B.

In the routine, first, in step #301, the state is checked to carry out the following process according to the state.

In the state 31, in step #311, a check is made to see if a signal S1 is inputted or not. The signal S1 is supplied as an input to the first CPU 201 through interface 216 when an up key 114 or a down key 115 of operation panel 100 is pushed. If it is NO in step #311, in step #315, the state is made "32".

If it is YES in step #311, it means that the operator set density which is one of elements of image quality. In this case, it is considered that the operator especially takes care of the image quality. Accordingly, when the operational condition of the copying machine A is in an inappropriate condition, it is necessary to inform the operator that it is difficult to form a copied image with desired image quality before starting copying operation.

Accordingly, in steps #312–#314, a check is made to see if condition data $C_{Vi}$, $C_{VR}$, $C_{VO}$ are stored, respectively, or each data is in RAM 209 or not. If it is YES in any of the respective steps #312–#314, the operational condition of the copying machine A is in an inappropriate condition. In this case, it proceeds to step #316.

In step #316, a warning display is made indicating that the operational condition of the copying machine A is in an inappropriate condition in message display portion 117 of operation panel 100.

Figure 20A:
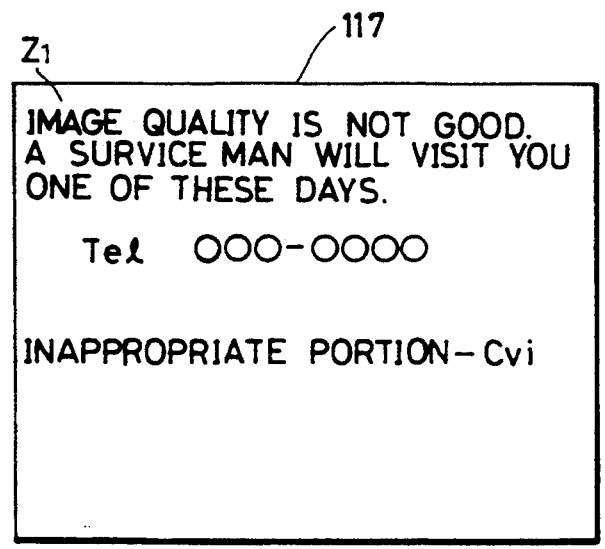
FIGS. 20A, 20B and 20C are diagrams showing examples of display by the message display portion of FIG. 12A.
Figure 20B:
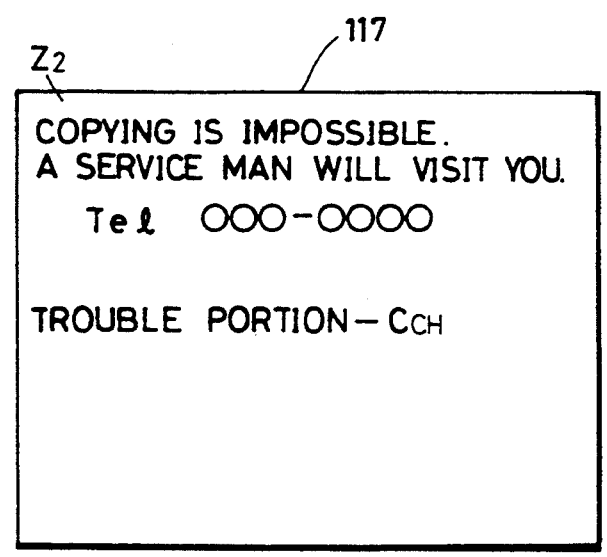
Figure 20C:
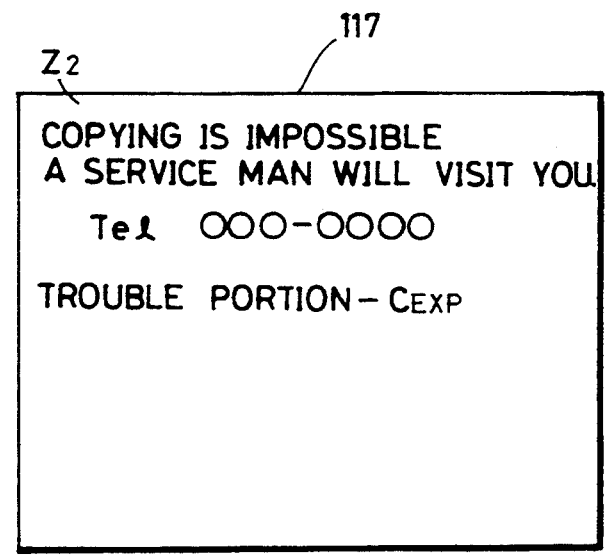

FIGS. 20A, 20B and 20C are diagrams showing examples of displayed screen of message display portion 117.

FIG. 20A shows a displayed screen when YES is made in step #312, in which ⌈$C_{Vi}$⌋ indicating an inappropriate portion is displayed together with a message sentence Z1 for an inappropriate condition case. If YES is also made in steps #313 and 314, a combination of ⌈$C_{VR}$⌋ and ⌈$C_{VO}$⌋ is also displayed.

In the state "32", first, in step #321, a check is made to see if the condition data $C_{CH}$ is stored or not, and if it is stored, in step #322, a warning display for an abnormal condition shown in FIG. 20B is made. In this case, a character ⌈$C_{CH}$⌋ indicating a trouble portion (an abnormal portion) is displayed together with a message sentence Z2 for an abnormal condition case.

Next, in step #323, a copying forbidding process is carried out for forbidding starting copying operation. That is, input of each key 101, 103–115 of operation panel 100 is forbidden and also control for turning off a power source in each portion except devices relating to the data process is performed.

Subsequently, in step #324, the state is updated to be "33".

In the state "33", first, in step #331, a check is made to see if the condition data $C_{EXP}$ is stored or not, and if it is stored, in step #332, a warning display for an abnormal condition is made as shown in FIG. 20C. In this case, the character ⌈$C_{EXP}$⌋ indicating a trouble portion is displayed. Here, if a warning display of ⌈$C_{CH}$⌋ has already been made in step #322, the character $C_{EXP}$ is made below ⌈$C_{CH}$⌋.

In step #333, a copying forbidding process similar to that in the above-described step #323 is carried out and the state is returned to "31" in step #334.

Figure 19:
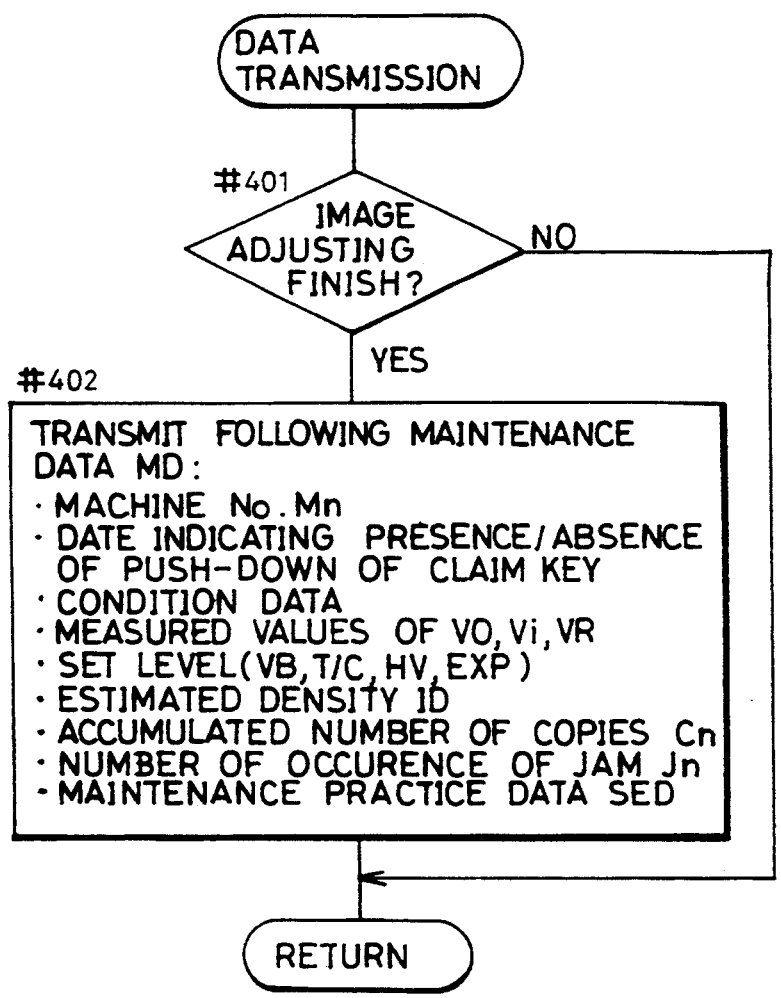
FIG. 19 is a flow chart showing specific contents of the data transmitting process of FIG. 16B.

FIG. 19 is a flow chart of the data transmission process in step #11 of FIG. 16B.

First, in step #401, a completion of image adjusting is confirmed with the above-described image adjusting completion flag FC.

When the completion of image adjusting is confirmed, in the following step #402, the maintenance data MD for determining if maintenance is needed or not is transmitted.

The maintenance data MD includes a machine number Mn for specifying a copying machine A, data indicating presence or absence of push-down of claim key 131, condition data stored in the above-described image adjusting process (corresponding one(s) of $C_{OK}$, $C_{T/C}$, $C_{Vi}$, $C_{VR}$, $C_{VO}$, $C_{CH}$, and $C_{EXP}$), measured values of three kinds of surface potential VH at the point of completion of the image adjusting process (dark potential VO, gray potential Vi, and bright potential VR), each set level (VB, T/C, HV, EXP), estimated density ID, accumulated number of copies Cn, number of paper jams occurring after the previous maintenance data MD transmission, and maintenance practice data SED showing presence/absence of maintenance work by a service man after the previous transmission and an accumulated number of copies at the work.

Figure 21:
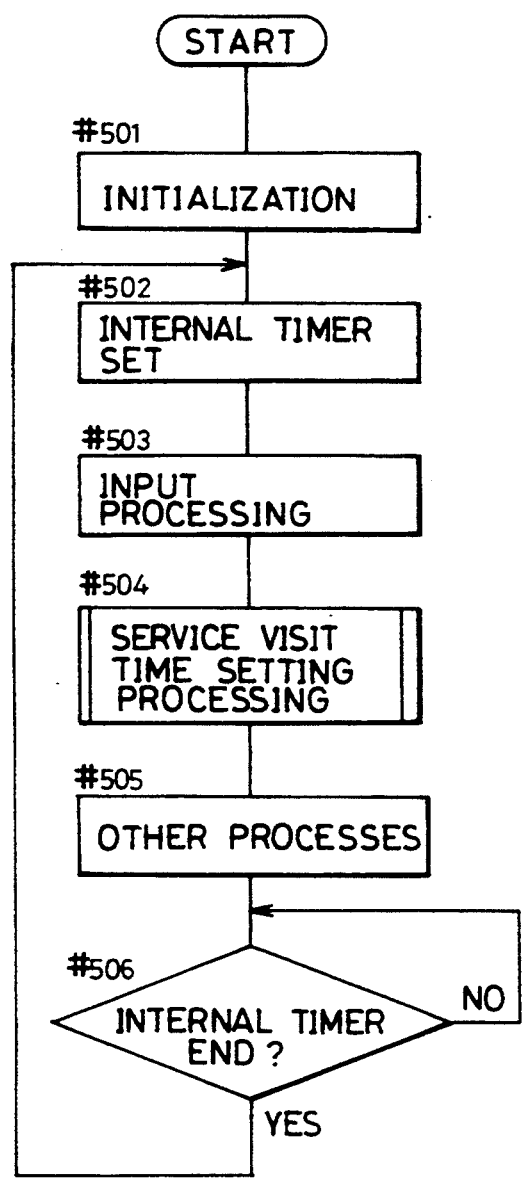
FIG. 21 is a flow chart showing a main routine of a host computer according to the first embodiment of the present invention.

FIG. 21 is a main flow chart schematically showing operation of host computer 301 according to the first embodiment of the present invention.

When a power source is turned on to start the program, first, initialization in each portion is performed in step #501, and an internal timer for defining a length of 1 routine is set in step #502.

Next, in step #503, an input process for receiving inputs from key board 303 and communication interface 306 is carried out, and in step #504, a service visit time setting process for setting a service visit date SV is executed.

Subsequently, other processes (step #505) are executed, and it returned to step #502 at completion of the internal timer in step #506.

Figure 22A:
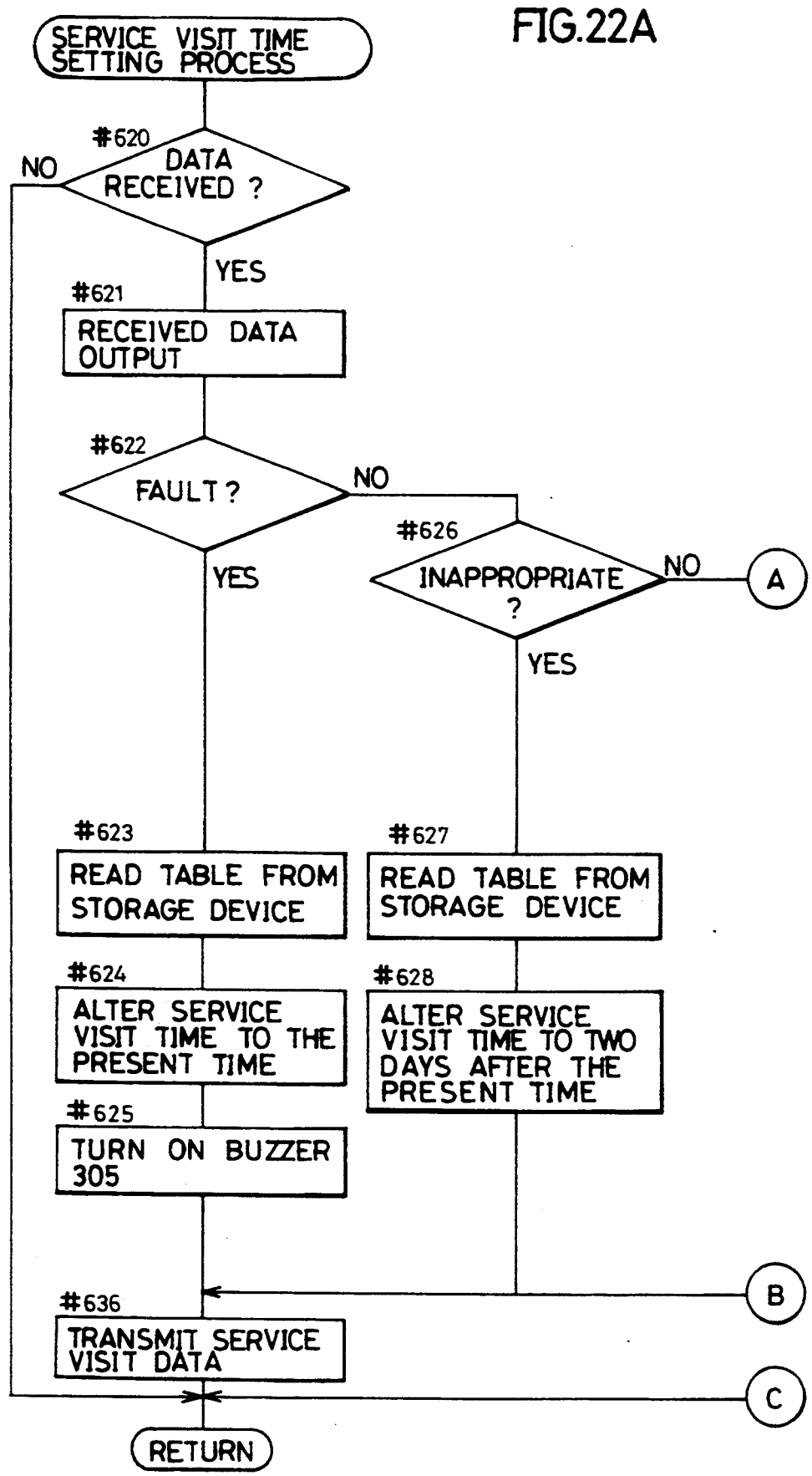
FIGS. 22A and 22B are flow charts showing specific contents of the service visit date setting process of FIG. 21.
Figure 22B:
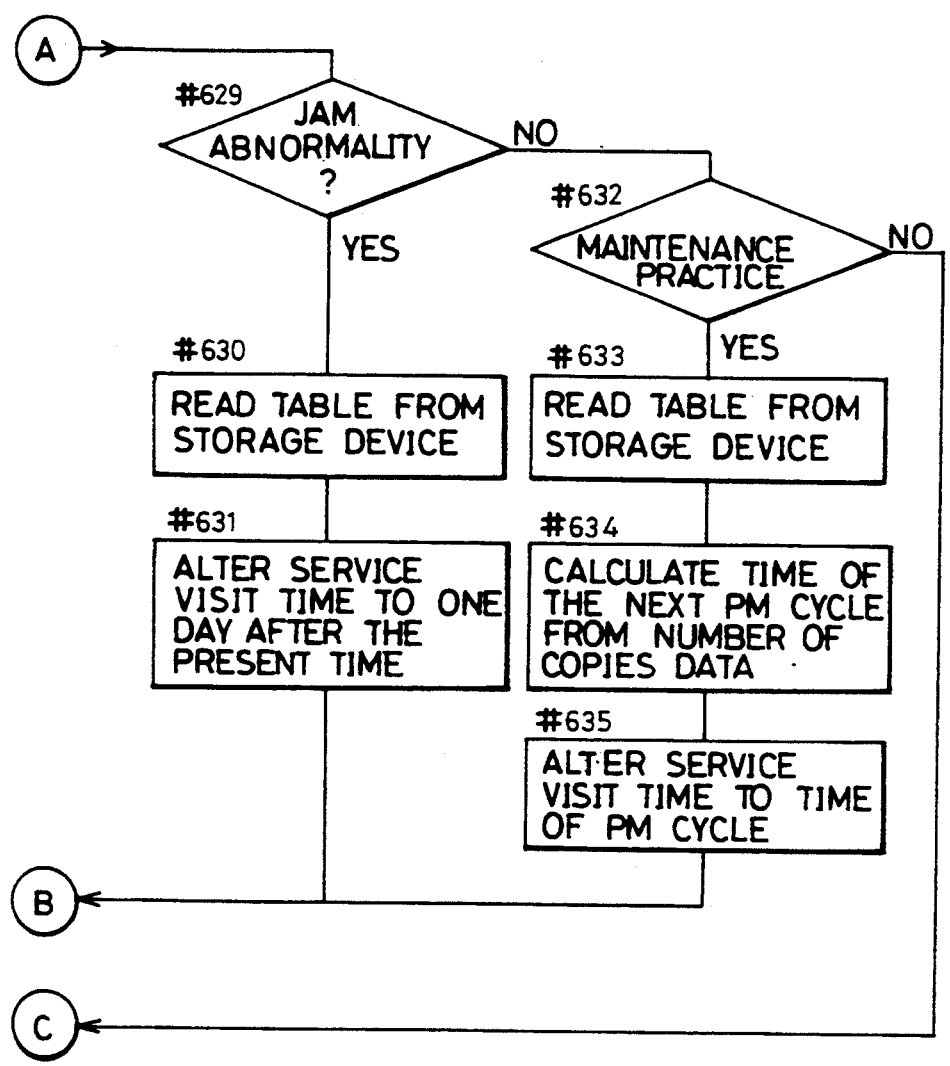

FIGS. 22A and 22B are flow charts of a service visit time setting process of step #504, and FIG. 23 is a diagram showing a schedule table ST.

In FIGS. 22A and 22B, first, in step #620, a check is made to see if maintenance data MD is received or not.

If the maintenance data MD is received, the received maintenance data MD is displayed in display device 302 and also printed out with a printer 304 (step #621). Subsequently, it proceeds to step #622, and a check is made to see if a fault occurred in the copying machine A or not.

When a fault occurred, the table ST is read out (step #623), in step #624, the service visit time for the copying machine A is altered to the present time.

In the table ST, machine numbers Mn1, Mn2 . . . of copying machines A1, A2 . . . for which a service visit is expected and conditions C for each time period divided into morning (A.M.) and afternoon (P.M.) in one day are stored.

The condition C includes G (Good) indicating an appropriate condition, N (No Good) indicating an inappropriate condition in which image quality in a permittable range is obtained but image is formed under electrophotographic process conditions different from reference ones, J (Jam) indicating a jam abnormal condition in which jam occurring percentage is larger than a reference one, and T (Trouble) in which a failure is occurring.

Also, in FIG. 23, a triangle symbol 245 indicates the present point.

In the process of the above-described step #624, a copying machine A is first specified from a machine number Mn.

For example, it is presumed that the copying machine A1 (machine number Mn1) is specified. In this example, according to the maintenance data MD received in the previous time, the condition C of the copying machine A1 is an appropriate condition (G), and a service visit was planned to be in the morning on Apr. 12, 1989. At the present reception, however, it is in a failure occurring condition (T), so that a service visit should be made immediately.

Accordingly, in step #624, as described above, the service visit time for the copying machine A1 is altered to be the present time on the morning of Apr. 2, 1989, and the condition C is made a fault occurring condition (T) simultaneously.

Returning to FIG. 22A, in step #625, a buzzer 305 is turned on to make a warning in order to have a service man make a service visit.

When the warning is made, the service man displays the table ST in the display 302 using key board 303, or print it out with the printer 304, and visits the user after confirming which copying machine A has a failure.

Subsequently, in step #636, the service visit data SD is transmitted to the copying machine A.

If it is NO in the above-described step #622, it shifts to step #626, and a check is made to see if the copying machine A is in an inappropriate condition or not.

If it is in an inappropriate condition, the table ST is read out (step #627), and in step #628, the service visit time for the copying machine A is altered to two days after the present time.

For example, in FIG. 23, the copying machine A1 is specified, the service visit time for the copying machine A1 is altered from afternoon Apr. 12, 1989 to morning Apr. 4, 1989 and the condition C is made an inappropriate condition (N) simultaneously. As for morning and afternoon, morning is basically selected.

If it is NO in step #626, it moves to step #629, a jam occurring ratio j is obtained on the basis of the number of jams Jn of the maintenance data MD, which is compared with the reference value j1 determined according to the type of the copying machine A, and a check is made to see if the copying machine A is in a jam abnormal condition or not.

The jam occurring ratio j can be expressed as the expression (1) below.

$$J = \frac{Jn(\text{the number of times of jam})}{AN_0 - AN_1} \quad (1)$$

$AN_0$ . . . accumulated number of copies at the present time $AN_1$ . . . accumulated number of copies at the previous time If the jam occurring ratio j exceeds the reference value j1, the possibility of some failures inside the copying machine A, especially in a paper passing system, is strong, so that an examination in a service visit is needed.

Accordingly, if it is in a jam abnormal condition, the table ST is read out (step #630), and in step #631, the service visit time for the copying machine A is altered to one day after the present time.

That is, in the jam abnormal condition, a service visit is made sooner than a case of an inappropriate condition.

For example, in FIG. 23, if the copying machine A1 is specified, the service visit time for the copying machine A1 is altered from afternoon of Apr. 12, 1989, to morning of Apr. 3, 1989, and the condition C is made a jam abnormal condition (J) simultaneously.

If it is NO in the above-described step #629, it moves to step #632, on the basis of the maintenance practice data SED, a check is made to see if maintenance is performed between reception of the previous maintenance data MD and the present transmission or not. In step #632, if it is YES, the table ST is read out in step #633.

In step #634, the date of the next PM cycle is obtained. The PM cycle is made according to the type of the copying machine A1, A2 . . . , which means the amount of operation (the number of copies) or the period (the number of days) from the exchange of parts, cleaning or so in maintenance work until the exchange of parts, cleaning or so are similarly necessary in the next time. The PM cycle PM of display of the number of copies (the number of paper) can be converted into the PM cycle PM (days) of display of the number of days on the basis of the following expression (2).

$$PM(\text{day}) = \frac{PM(\text{number of copies})}{(CN_0 - CN_1)/(DA_0 - DA_1)}$$

$CN_0$ . . . accumulated number of copies at the present time $CN_1$ . . . accumulated number of copies at the present time $DA_0$ ... date at the present time $DA_1$ ... date at the previous time     (2)

Accordingly, the day PM days after the newest service visit day included in the maintenance practice data SED is the time for the next PM cycle.

In step #635, the service visit time is altered to the next PM cycle time obtained in step #634.

For example, in FIG. 23, in the description of the copying machine A3 (machine number Mn3), if it is presumed that the newest service visit for the copying machine A3 is implemented as placed in the ⌈ afternoon (p.m.) Apr. 1, 1989 ⌋ and the PM (days) is 32, the service visit time is altered from ⌈ afternoon (p.m.) Apr. 1, 1989 ⌋ to ⌈ morning (a.m.) May 3, 1989 ⌋.

After the processes of steps #628, 631 and 635, the process in the above mentioned step #636 is also carried out, and the service visit data SD based on the newest table ST after alteration is transmitted to the specified copying machine A.

A service man can display or print out the newest table ST any time.

In the above-described embodiment, the image adjusting process for improving the image quality is started by pushing down claim key 131, or, setting in each portion is automatically performed (self-recovery operation) to obtain excellent image quality immediately when an operator is not satisfied with the image quality, so that the inconvenience for a user due to image quality degradation can be restrained to the minimum.

According to the above-described embodiment, a service man can confirm the conditions of each copying machine A at a user in order to determine whether maintenance is required or not while staying at a service station SS not by a service visit. Accordingly, the maintenance cost can be reduced because the time and labor required for a service visit are reduced.

Also, in the service visit, the service man already knows conditions of the copying machine A which is an object of the maintenance, so that he can bring necessary repairing parts to work effectively.

According to the above-described embodiment, the maintenance data MD showing conditions of each copying machine A and push-down of claim key 131 is transmitted, so that the maintenance data MD from a large number of copying machines A collected by control unit 227 can be utilized for analyzing the occurrence conditions of troubles such as jam, faults or user claims. Furthermore, a large number of maintenance data MD transmitted from a large number of copying machines A can be received as external events for fault diagnosis in the field of the artificial intelligence (AI) to be utilized for estimating causes of faults.

In the above-described embodiment, as operation for maintenance in response to a command signal SF, an example of transmitting maintenance data MD focusing on maintenance and stabilization of the image quality has been illustrated, but the maintenance data MD can be transmitted as results of checks in response to a command signal SF for operation of mechanism parts and electric parts, paper passing conditions, and various functions related to image forming such as presence or absence of an abnormality in program performance.

Also, as a process for maintenance the first CPU 201 executes on the basis of a command signal SF, not limited to the process for enabling confirmation of conditions by a service man, it can be a process for adjusting each portion according to the conditions. For example, it can be processes for alteration of each set level, or toner supply by driving toner supply roller 77.

That is, as for small troubles, a service man may repair it by remote control at a service station SS. In the case, control unit 227 does not necessarily have to include a data processing function, and it can be a simple push-down button switch as long as it can produce a command signal SF.

Next, other examples about setting of a service visit time will be described.

In the above-described embodiment, host computer 301 automatically sets a service visit time SV according to the maintenance data MD transmitted from a copying machine A, but a service man may manually set a service visit time SV.

That is, at a service station SS, with a demand for a service visit by an operator through a telephone call or the like, the service man sets a service visit time SV at a convenient date while referring to a schedule note or so. Subsequently, using key board 303, the service visit time SV is inputted and the service visit data SD are transmitted to the copying machine A.

In the copying machine A, on the basis of the service visit data SD similarly to the above-described embodiment, the message Z1 is displayed to inform the operator of the visit date through an operation panel 100 before the service man actually makes a visit.

That is, according to the embodiment, control unit 227 does not have to be provided with the above-described service visit time setting process function, so that the structure of control net work system 500 can be simplified. Also, if the transmitting function of the maintenance data MD of the copying machine is omitted, and a service man tries to know the conditions of a trouble through interaction with the operator, then the control network system 500 can be further simplified.

Furthermore, another embodiment about setting of the service visit time SV will be described.

The service visit time SV can be set by a copying machine A. That is, a CPU 201 of the copying machine A performs a setting process of the service visit time.

In this case, the copying machine A has a calendar function, and the CPU 201 sets a date obtained by adding predetermined days to the present time according to the degree of urgency as a service visit time SV and displays the message Z1. Simultaneously, it informs the control unit 227 through the telephone line 230 that it has set the service visit time SV.

A claim key for demanding a service visit may be provided in a copying machine A for a setting process of the service visit time SV with a push-down of the claim key by an operator.

In the above-described embodiment, the communication between the copying machine A and the control unit 277 is all performed on-line, but a part or all of the communication paths may be structured as a radio system.

According to the present invention, troubles on the user side for demanding service visit can be reduced, and also the efficiency of maintenance by a service man can be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus connected to an external control unit through a communication line, said external control unit includes means for sending a control signal to the image forming apparatus through the communication line, said image forming apparatus comprising:

image forming means for forming an image on paper, said image forming means performing an image forming operation using a variable parameter;

receiving means connected with the communication line for receiving the control signal from the external control unit through said communication line;

detecting means for detecting a condition of said image forming means;

adjusting means for varying said parameter based on a result of said detecting means; and control means for controlling said detecting means and said adjusting means such that said detecting means detects the condition of said image forming means and said adjusting means varies said parameter used in said image forming operation in response to reception of said control signal by said receiving means.

2. The image forming apparatus according to claim 1, wherein said image forming means further comprises transmission means for transmitting the detected result by said detecting means through said communication line.

3. The image forming apparatus according to claim 2, wherein said detecting means detects density of an image formed by said image forming means.

4. The image forming apparatus according to claim 2, wherein said detecting means detects abnormality of operation of said image forming means.

5. The image forming apparatus according to claim 2, wherein said image forming means comprises a photoreceptor, a charger for a surface of said photoreceptor, exposure means for forming an electrostatic latent image by irradiating light corresponding to an original image on said charged photoreceptor, developing means for developing said formed electrostatic latent image with toner, and transfer means for transferring the toner image formed by said developing means on the paper.

6. The image forming apparatus according to claim 5, wherein said detecting means comprises measuring means for measuring a specified physical quantity in said image forming means.

7. The image forming apparatus according to claim 6, wherein said physical quantity comprises a surface potential of said photoreceptor.

8. The image forming apparatus according to claim 6, wherein said physical quantity comprises density of the toner image formed on said photoreceptor.

9. An image forming apparatus connected to an external device through a communication line, said external device includes means for sending a control signal to the image forming apparatus through the communication line, said image forming apparatus comprising:

image forming means for performing an image forming operation using a predetermined value which affects image quality;

receiving means connected with the communication line for receiving the control signal from the external device through said communication line;

detecting means for detecting a current image forming ability of the image forming means in response to reception of said control signal; and altering means for altering said predetermined value used in said image forming operation in response to a result of said detection means.

10. An image forming apparatus connected to an external device through a communication line, said external device includes means for sending a control signal to the image forming apparatus through the communication line, said image forming apparatus comprising:

image forming means for forming an image on paper;

receiving means connected with the communication line for receiving the control signal from the external device through said communication line;

control means for detecting an operation condition of said image forming means in response to reception of said control signal and also adjusting image quality formed by said image forming means on the basis of said detected condition; and transmission means connected with said communication line for transmitting through said communication line an amount of adjustment performed by said control means.

11. The image forming apparatus according to claim 10, wherein said transmission means transmits information indicating density of an image formed by said image forming apparatus together with said adjustment content.

12. A control system comprising:

a control unit;

an image forming apparatus; and a communication line connecting the image forming apparatus to said control unit;

said image forming apparatus includes:

image forming means for performing an image forming operation using a predetermined value which affects image quality;

means for receiving a predetermined control signal transmitted from said control unit through said communication line;

detecting means for detecting an operational condition of said image forming means in response to reception of said control signal;

means for altering said predetermined value used in said image forming operation on the basis of the detected result by said detecting means; and means for transmitting information indicating the altered value to said control unit through said communication line; and said control unit includes:

means for transmitting said control signal to said image forming apparatus;

means for receiving the information transmitted from said image forming apparatus; and means for supplying as an output the information received by said receiving means.

13. An image forming apparatus connected to an external device through a communication line, said image forming apparatus comprising:

image forming means for forming an image on paper;

key means for receiving key input;

detecting means, actuated in response to said key input, for detecting a condition of said image forming means; and transmission means connected with said communication line for transmitting through said communication line a result detected by said detecting means to the external device together with a signal indicating that said key input is received by said key means.

14. The image forming apparatus according to claim 13, wherein said detecting means detects density of an image formed by said image forming means.

15. The image forming apparatus according to claim 13, wherein said image forming means comprises a photoreceptor, a charger for charging a surface of said photoreceptor, exposure means for forming an electrostatic latent image by irradiating light corresponding to an original image to said charged photoreceptor, developing means for developing said formed electrostatic latent image with toner, and transfer means for transferring the toner image formed by said developing means on paper, and said detecting means comprises measuring means for measuring surface potential of said photoreceptor.

16. An image forming apparatus connected to an external control unit through a communication line, said image forming apparatus comprising:

image forming means for performing an image forming operation using a predetermined value for determining image quality;

key means for receiving key input;

means for altering said predetermined value used in said image forming operation in response to the key input of said key means; and transmission means connected with said communication line for transmitting the altered value to said control unit through said communication line together with a signal indicating that said key input is received by said key means.

17. The image forming apparatus according to claim 16, wherein said image forming means comprises a photoreceptor, a charger for charging a surface of said photoreceptor, exposure means for forming an electrostatic latent image by irradiating light corresponding to an original image to the charged said photoreceptor, developing means for developing said formed electrostatic latent image with toner, and transfer means for transferring the toner image formed by said developing means on paper.

18. The image forming apparatus according to claim 17, wherein said developing means is provided with a developer including toners and carriers, and said predetermined value comprises toner concentration in said developer.

19. The image forming apparatus according to claim 17, wherein said predetermined value comprises a voltage applied to said charger.

20. The image forming apparatus according to claim 17, wherein said predetermined value comprises an amount of light irradiated by said exposure means.

21. An image forming apparatus connected to an external device through a communication line, comprising:

image forming means for forming an image on paper;

detecting means for detecting an operational condition of said image forming means;

image adjusting means for adjusting an image quality formed by said image forming means on the basis of the operational condition detected by said detecting means;

transmission means connected with said communication line for transmitting an indication of the adjustment made by said image quality adjusting means to the external device through said communication line;

key means for receiving key input; and control means for operating said detecting means, said image quality adjusting means, and said transmitting means in series in response to the key input of said key means.

22. An image forming apparatus, comprising:

image forming means for forming an image on paper;

detecting means for detecting operation condition of said image forming means;

image quality adjusting means for adjusting quality of an image formed by said image forming means on the basis of the detected result of said detecting means;

input means for inputting a signal commanding adjustment of image quality;

first control means for sequentially operating said detecting means and said image quality adjusting means in response to input of the signal from said input means;

paper jam detecting means for detecting occurrence of paper jam in said image forming means; and second control means for forbidding operation of said first control means when a paper jam is occurring, and when the paper jam is removed, releasing the forbidden operation of said first control means and also sequentially operating said detecting means and said image quality adjusting means.

23. An image forming apparatus, comprising:

image forming means for forming an image on paper;

a casing covering said image forming means and having an openable portion;

condition detecting means for detecting operation condition of said image forming means;

image adjusting means for adjusting quality of an image formed by said image forming means on the basis of the detected result of said condition detecting means;

input means for inputting a signal commanding adjustment of quality of an image;

first control means for sequentially operating said condition detecting means and said image quality adjusting means in response to input of the signal from said input means;

open detecting means for detecting open condition of said casing; and second control means for forbidding operation of said first control means when said signal is supplied from said input means while the portion of said casing is open, and releasing the forbidden operation of said first control means and also sequentially operating said condition detecting means and said image quality adjusting means when said open detecting means detects that the portion of said casing is closed.

24. A control system comprising:

a control unit;

an image forming apparatus; and a communication line connecting the image forming apparatus to said control unit;

said image forming apparatus includes:

image forming means for forming an image on paper;

detecting means for detecting operation condition of said image forming means; and means for transmitting a result detected by said detecting means to said control unit through said communication line; and said control unit includes:

means for receiving the detected result transmitted from said image forming apparatus; and means for setting date of a service man visit for maintenance of said image forming apparatus on the basis of the detected result received by said receiving means.

25. The control system according to claim 24, wherein said control unit comprises means for transmitting the date of the service man visit to said image forming apparatus through said communication line, and said image forming apparatus comprises means for receiving the date transmitted from said control unit and display means for displaying said received date.

26. A control system of an image forming apparatus comprising an image forming apparatus and a control unit connected to said image forming apparatus through a communication line, comprising:

detecting means for detecting operational condition of said image forming apparatus;

schedule setting means for setting date of a service man visit for maintenance of said image forming apparatus on the basis of the detected result by said detecting means; and display means provided in said image forming apparatus for displaying the date set by said schedule setting means.

27. A control system comprising:

a control unit;

an image forming apparatus; and a communication line connecting the image forming apparatus to said control unit;

said image forming apparatus includes:

image forming means for forming an image on paper;

detecting means for detecting operational condition of said image forming means; and means for transmitting a result detected by said detecting means to said control unit through said communication line; and said control unit includes means for transmitting a date of a service man visit for maintenance of said image forming apparatus through said communication line to said image forming apparatus, and said image forming apparatus further includes means for receiving the date transmitted from said control unit and display means for displaying said received date.

28. An image forming apparatus connectable to an external control unit through a communication line, comprising:

image forming means for forming an image on paper;

receiving means for receiving a signal indicating a date of a service man visit for maintenance of said image forming apparatus transmitted from said control unit; and display means for displaying said date on the basis of said received signal.

29. The image forming apparatus according to claim 28, wherein said image forming apparatus further comprises detecting means for detecting operational condition of said image forming means and means for transmitting the detected result by said detecting means through said communication line to said control unit.

30. An image forming apparatus comprising:

image forming means for forming an image on paper;

detecting means for detecting a condition of the apparatus; and date setting means for setting a date for a service visit for maintenance of the apparatus on the basis of the condition detected by said detecting means.

31. The image forming apparatus according to claim 30, wherein said date setting means includes a classifying of the condition detected into one of a plurality of maintenance levels and data deciding means for deciding the date for a service visit for maintenance of the apparatus on the basis of the maintenance level of the condition detected.

32. The image forming apparatus according to claim 30, further comprising:

display means for displaying the date set by said date setting means.

33. A control system comprising:

a control unit;

an image forming apparatus;

a communication line connecting the image forming apparatus to said control unit;

said image forming apparatus includes:

image forming means for forming an image on paper;

detecting means for detecting a condition of the apparatus; and means for transmitting data representing the condition detected by said detecting means to said control unit through said communication line;

said control unit includes:

means for receiving the data sent through the communication line; and date setting means for setting a date for a service visit for maintenance of the apparatus on the basis of the data received by said receiving means.

34. The control system according to claim 33, said control unit further comprising:

date transmitting means for transmitting second data representing the date of a service visit for maintenance of the apparatus through the communication line to the image forming apparatus; and said image forming apparatus further comprising:

data receiving means for receiving the second data sent through the communication line; and display means for displaying the date represented by said second data.

* * * * *